(12) United States Patent
Wang

(10) Patent No.: US 8,937,406 B2
(45) Date of Patent: Jan. 20, 2015

(54) UNINTERRUPTIBLE POWER SUPPLY SYSTEM HAVING A SIMPLIFIED VOLTAGE DETECTION CIRCUIT

(75) Inventor: Jian Wang, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 505 days.

(21) Appl. No.: 13/423,132

(22) Filed: Mar. 16, 2012

(65) Prior Publication Data

US 2013/0241291 A1 Sep. 19, 2013

(51) Int. Cl.
 *H02J 3/00* (2006.01)
(52) U.S. Cl.
 USPC .......................................................... 307/66
(58) Field of Classification Search
 CPC ........................................................ H02J 3/00
 USPC .......................................................... 307/66
 See application file for complete search history.

(56) References Cited

U.S. PATENT DOCUMENTS

| | | | | |
|---|---|---|---|---|
| 5,579,197 | A * | 11/1996 | Mengelt et al. ............... | 361/93.4 |
| 2005/0029963 | A1* | 2/2005 | Lee ................................ | 315/291 |
| 2005/0073860 | A1* | 4/2005 | Yang et al. ..................... | 363/16 |
| 2006/0044846 | A1* | 3/2006 | Hjort et al. ..................... | 363/34 |
| 2010/0314944 | A1* | 12/2010 | Kotlyar et al. ................. | 307/65 |

\* cited by examiner

*Primary Examiner* — Rexford Barnie
*Assistant Examiner* — Joseph Inge
(74) *Attorney, Agent, or Firm* — Pai Patent & Trademark Law Firm; Chao-Chang David Pai

(57) ABSTRACT

A UPS system having a system ground terminal includes a main circuit having a power input terminal set connected to the AC mains, two switches respectively corresponding to a live line and a neutral line of the AC mains, a frequency detection module connected to the power input terminal set, a voltage division module composed of multiple voltage dividers, and the two switches and a central controller grounded through the system ground terminal and connected to the frequency detection module. The system ground terminal is connected to the neutral line through one of the switches. The central controller and the neutral line are equipotential after the frequency detection module detects a normal mains power and the central controller controls the switch connected to the neutral line to switch on. With the foregoing circuit, the UPS system can detect the voltage of the mains power in a simplified fashion.

12 Claims, 29 Drawing Sheets

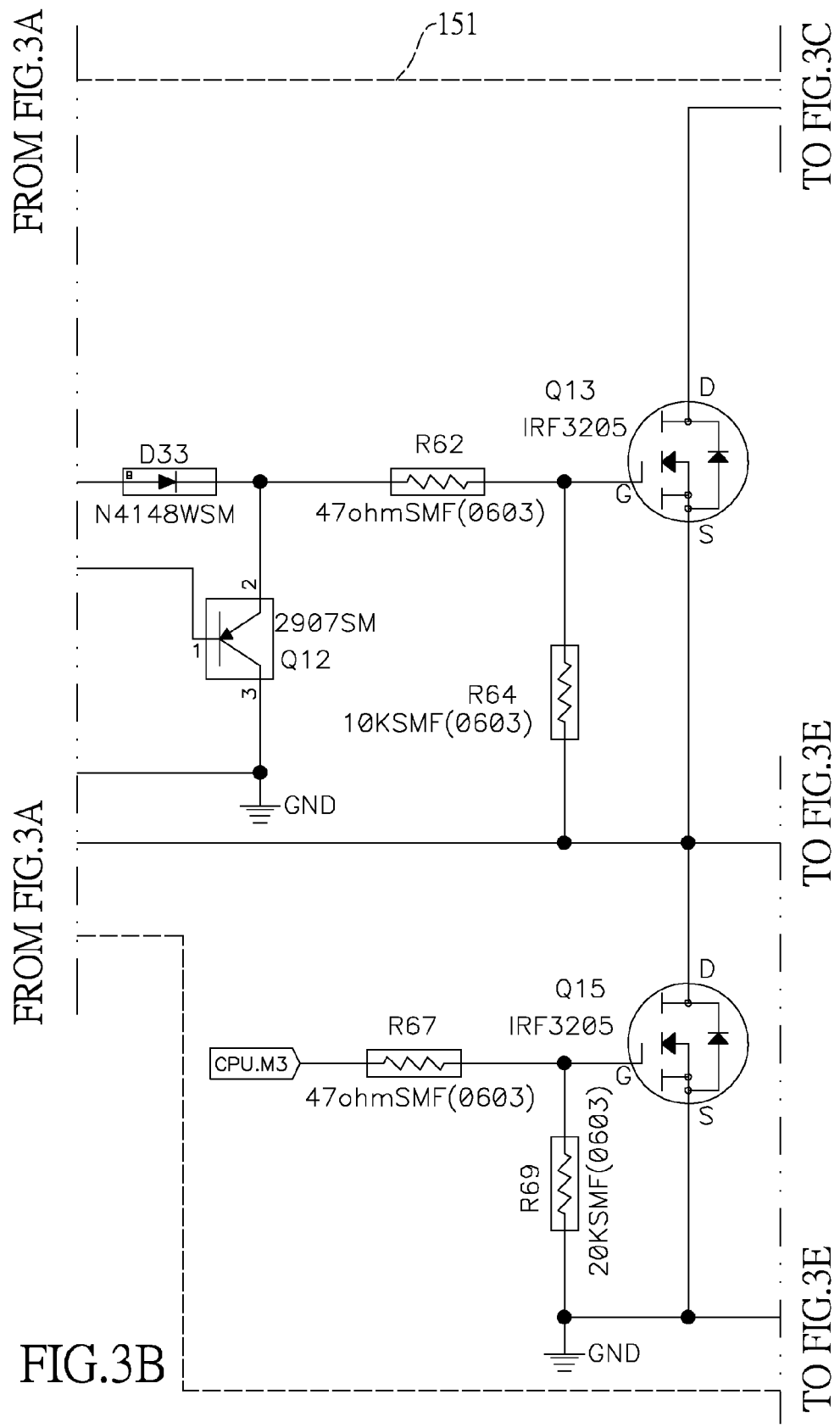

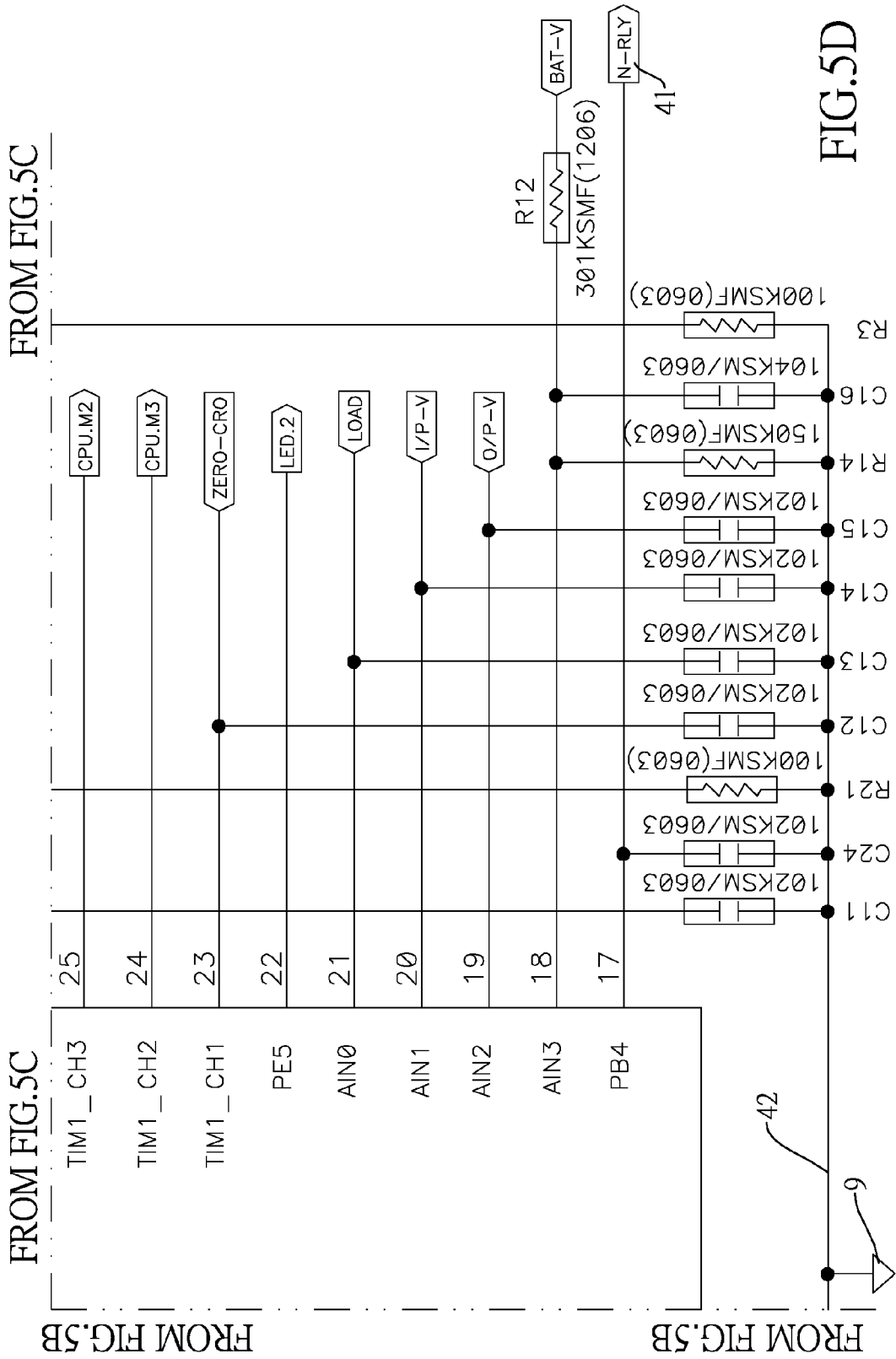

UNINTERRUPTIBLE POWER SUPPLY SYSTEM HAVING A SIMPLIFIED VOLTAGE DETECTION CIRCUIT

BACKGROUND OF THE INVENTION

1. Field of the Invention

The present invention relates to an uninterruptible power supply (UPS) system and more particularly to a UPS system having a simplified voltage detection circuit.

2. Description of the Related Art

UPS systems usually target at supplying power to downstream electric equipment when detecting an abnormal state of the mains power, such as power outage, surge or irregular high/low voltage, and are most frequently applied to telecommunication networks, private branch exchanges (PBXs), servers and the like requiring power to operate around the clock to avoid information and data loss, interruption in operation and even damage to equipment arising from the irregularity or failure of the mains power.

With reference to FIG. 9, a conventional UPS system is connected to a live line and a neutral line of the AC mains and has a system ground terminal. The conventional UPS system further has a main circuit 70, a frequency and voltage detection module 80 and a central controller 90.

The main circuit 70 is grounded through the system ground terminal and has a power input terminal set 71, a power output port 72, two switches 73, a mains power processing unit 74 and a backup power circuit 75. The power input terminal set 71 has a live terminal 711 and a neutral terminal 712 respectively connected to the live line and the neutral line of the AC mains. The live terminal 711 is connected to the backup power circuit 75 and the power output port 72 through one of the two switches 73 and the mains power processing unit 74. The neutral terminal 712 is connected to the backup power circuit 75 and the power output port 72 through the other switch 73.

The frequency and voltage detection module 80 is grounded through the system ground terminal, is connected to the live terminal 711 and the neutral terminal 712 of the power input terminal set 71 of the main circuit 70, detects the frequency and voltage of the mains power respectively through the live terminal 711 and the neutral terminal 712, and has a detected frequency output terminal 81 and a detected voltage output terminal 82.

The central controller 90 is connected to the two switches 73, the detected frequency output terminal 81 and the detected voltage output terminal 82 of the frequency and voltage detection module 80, has a ground terminal 91 grounded through the system ground terminal, and is built in with a frequency value range and a voltage value range. The central controller 90 detects a frequency value of the mains power and a voltage value between the live line and the neutral line of the AC mains through the frequency and voltage detection module 80. When determining that the frequency value is within the frequency value range and the voltage value is within the voltage value range, the central controller 90 controls the two switches 73 to switch on so that the AC mains supplies power through the power output port 72 and simultaneously charges the backup power circuit 75. When determining that the frequency value is not within the frequency value range or the voltage value is not within the voltage value range, the central controller 90 controls the two switches 73 to switch off and the backup power circuit 75 supplies power through the power output port 72.

With the foregoing UPS system, when the AC mains normally supplies power, the mains power is processed through the mains power processing unit 74 and then supplies power to an electric appliance connected to the power output port. The mains power processing unit is usually a voltage stabilizing circuit to lower or stabilize voltage of the mains power. When the AC mains is in an abnormal condition, such as power outage, surge, extraordinarily high/low voltage of high/low frequency, the backup power circuit 75 supplies power instead. Generally, the backup power circuit 75 has an AC and DC converter 751 and a rechargeable battery 752. When the mains power is normal, the mains power is converted into DC power by the AC and DC converter 751 to charge the rechargeable battery 752. When the backup power circuit 75 supplies power, the DC power supplied by the rechargeable battery 752 is converted into AC power by the AC and DC converter 751 to supply power. Hence, the power outputted from the power output port has stable frequency and voltage independent of the abnormal condition of the mains power. Although such UPS system achieves the effect of ensuring output power quality, the circuits of the frequency and voltage detection module 80 are so complicated that the components used are quite costly.

With reference to FIGS. 10A to 10D, the frequency and voltage detection module 80 is composed of a voltage detection unit 83 and a frequency detection unit 84. As the voltage of the neutral line of the AC mains is not equal to that of the system ground terminal, a voltage difference usually exists therebetween. To avoid the voltage difference causing deviation between a voltage detected by the central controller 90 and an actual voltage, input and output of the voltage detection unit 83 must be isolated, that is, the voltage level of the neutral line of the AC mains is taken by the voltage detection unit 83 as an input voltage level compared with the voltage level of the live line of the AC mains while the voltage level of the system ground terminal is taken as the output voltage level of the voltage detection unit 83. Consequently, the voltage detection unit 83 needs to be implemented by comparators having isolating effect and thus has a complicated circuit.

Moreover, to further ensure the quality of the voltage and frequency of the power outputted from the power output port 72, the UPS system further has an output power detection unit 76. The output power detection unit 76 usually has a voltage detection circuit and a current detection circuit. The voltage detection circuit and the current detection circuit are connected to the central controller 90, respectively detect voltage and current outputted from the power output port 72, and then output an output power calculated by the central controller 90. As a voltage difference exists between the system ground terminal of the UPS system and the neutral line of the AC mains, with reference to FIGS. 11A to 11D, the voltage detection unit of the output power detection unit 76 has two comparators 761 with isolating effect, and the output power detection unit 76 has a considerably complicated circuit and is costly.

With reference to FIG. 12, a conventional current detection circuit 762 usually serves to detect current of the neutral line of the AC mains. Similarly, as voltages of the neutral line of the AC mains and the system ground terminal deviate, the current detection circuit 762 should also provide isolating effect and has a current transformer 763 and a bridge rectifier 764. The current of the neutral line flows to two input terminals of the current transformer 763, is sensed by the current transformer 763, and outputted to the system ground terminal and the central controller 90 through the two output terminals of the current transformer 763 and the bridge rectifier 764. The current detection unit 762 also has a complicated circuit and the current transformer 763 is large in size and space-consuming.

SUMMARY OF THE INVENTION

An objective of the present invention is to provide a UPS system having a simplified voltage detection circuit.

To achieve the foregoing objective, the UPS system is connected to a live line and a neutral line of an AC mains supplying mains power and has a system ground terminal. The UPS system has a main circuit, a frequency detection module, a voltage division module and a central controller.

The main circuit is grounded through the system ground terminal and has a power output port, two switches, a mains power processing unit, a backup power circuit and a power input port. The power input port has a live terminal and a neutral terminal respectively connected to the live line and the neutral line of the AC mains. The live terminal is connected to the power output port and the backup power circuit through one of the switches and the mains power processing unit, and the neutral terminal is connected to the power output port, the system ground terminal and the backup power circuit through the other switch.

The frequency detection module is grounded through the system ground terminal and has two input terminals and a detected frequency output terminal. The input terminals are respectively connected to the live terminal and the neutral terminal of the power input port for the frequency detection module to detect a frequency of the mains power. The detected frequency output terminal is separated from the input terminals of the frequency detection module.

The voltage division module is connected to the live terminal of the power input port of the main circuit and the system ground terminal, and has multiple voltage dividers connected between the live terminal and the system ground terminal to divide an input voltage of the live line of the AC mains into an output voltage of the voltage division module equal to a fraction of the input voltage of the live line.

The central controller is connected to the frequency detection module and the voltage division module, and has two control terminals, a ground terminal and a frequency value range and a voltage value range. The ground terminal is grounded through the system ground terminal. The frequency value range and the voltage value range are built in the central controller. When detecting that a value of the frequency of the mains power falls within the frequency value range through the frequency detection module, the central controller switches on the switch connected to the neutral terminal, and when detecting that the value of the divided voltage outputted from the voltage division module falls within the voltage value range, the central controller switches on the switch connected to the live terminal.

The central controller controls the switches connected to the neutral line of the AC mains to switch on upon detecting that the frequency of the mains power is normal. Thus, the neutral line of the AC mains and the system ground terminal of the UPS system are equipotential. Besides, the central controller detects the voltage of the live line of the AC mains through the voltage division module, which is implemented by multiple voltage dividers, thereby simplifying the circuit complication, diminishing the size and lowering the production cost of the UPS system.

Other objectives, advantages and novel features of the invention will become more apparent from the following detailed description when taken in conjunction with the accompanying drawings.

BRIEF DESCRIPTION OF THE DRAWINGS

FIGS. 3A to 3E are divisions of a circuit diagram of the backup power circuit omitted in FIG. 2;

FIGS. 5A to 5D are divisions of a circuit diagram of a central controller in FIG. 1;

DETAILED DESCRIPTION OF THE INVENTION

Figure 1:
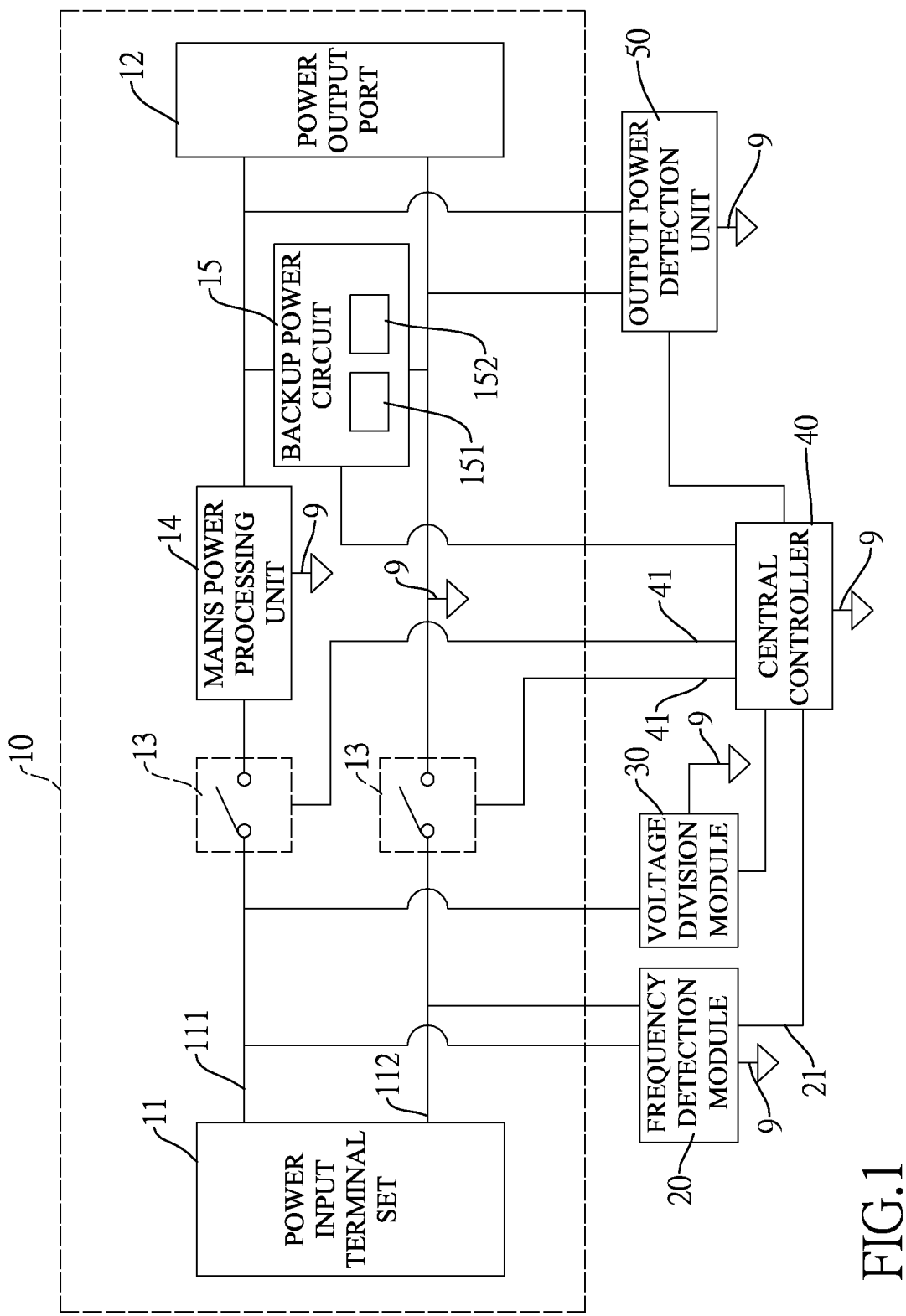
FIG. 1 is a functional block diagram of a UPS system having a simplified voltage detection circuit in accordance with the present invention.
Figure 2A:
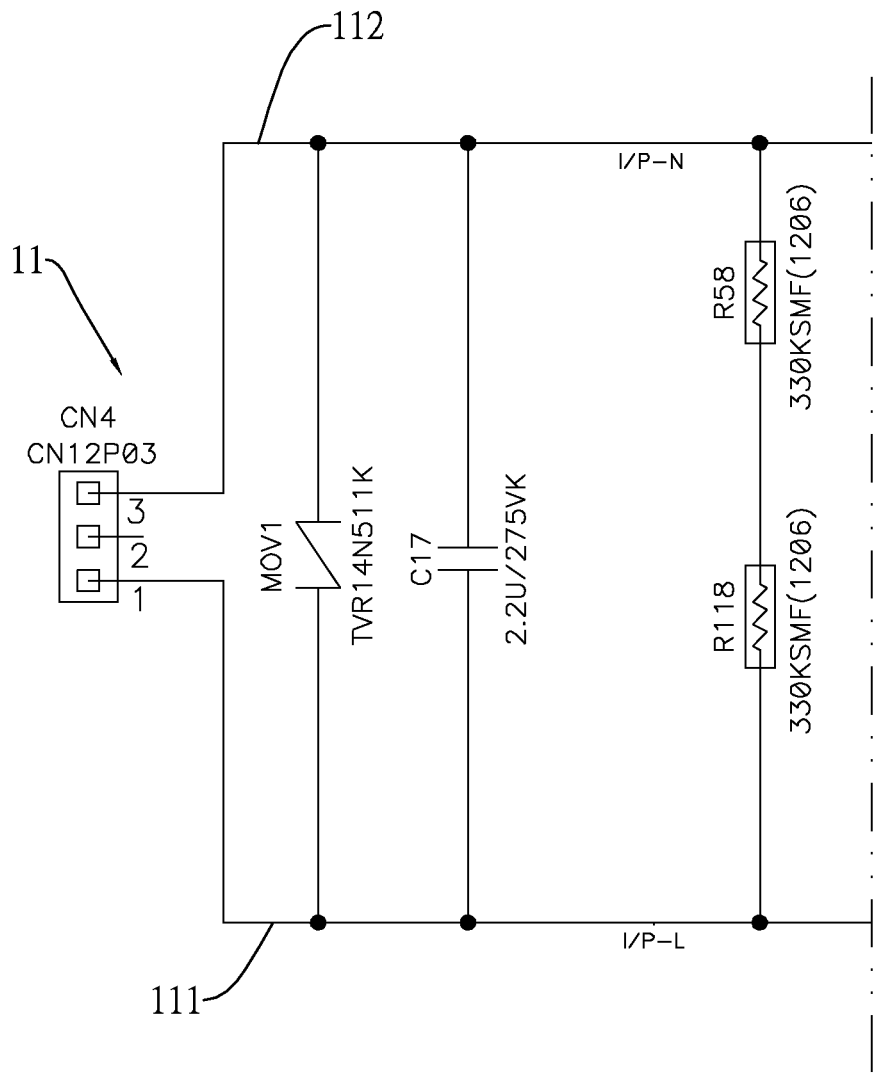
FIGS. 2A to 2E are divisions of a circuit diagram of the UPS system in FIG. 1 excluding a backup power circuit.
Figure 2B:
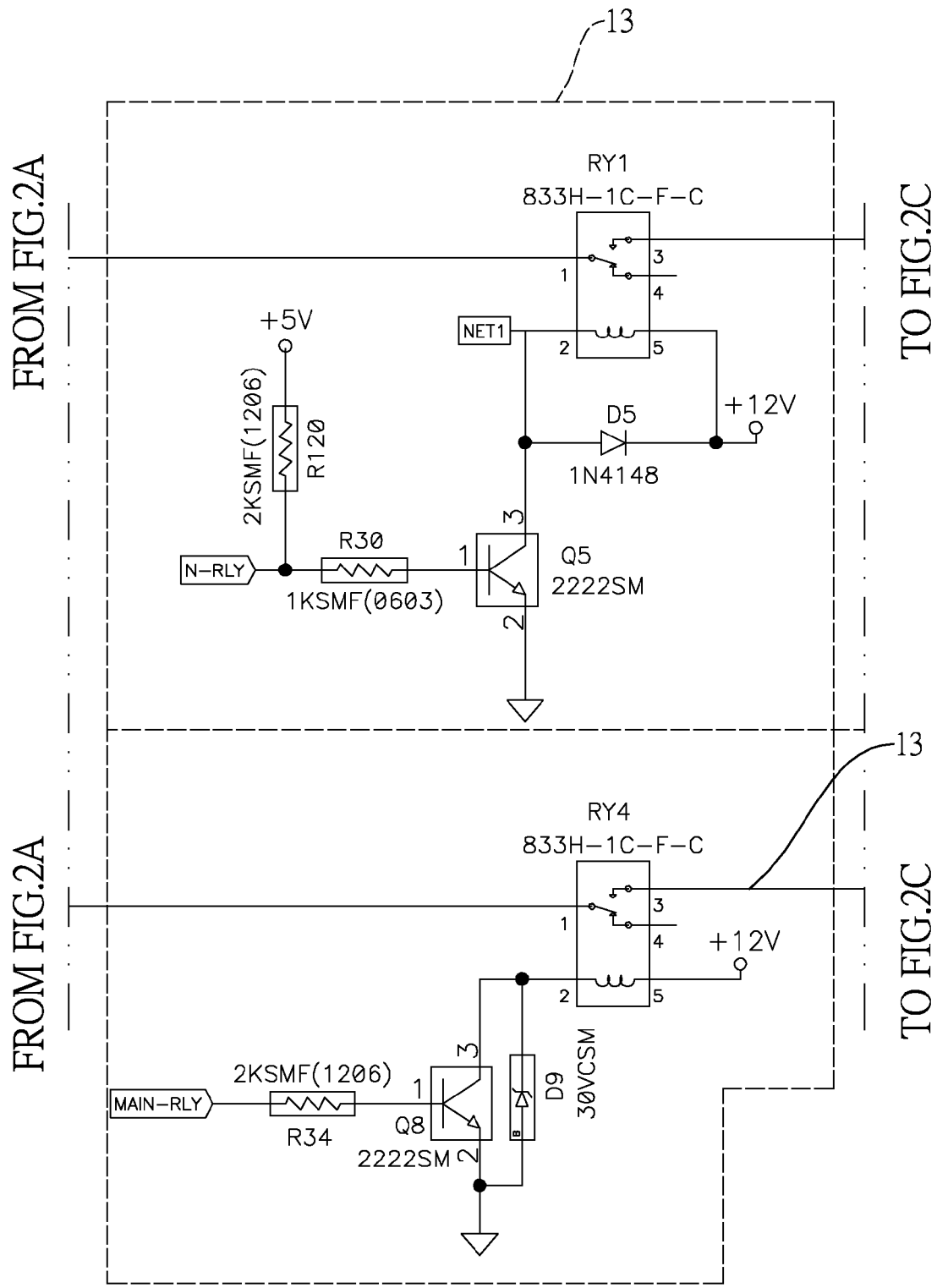
Figure 2C:
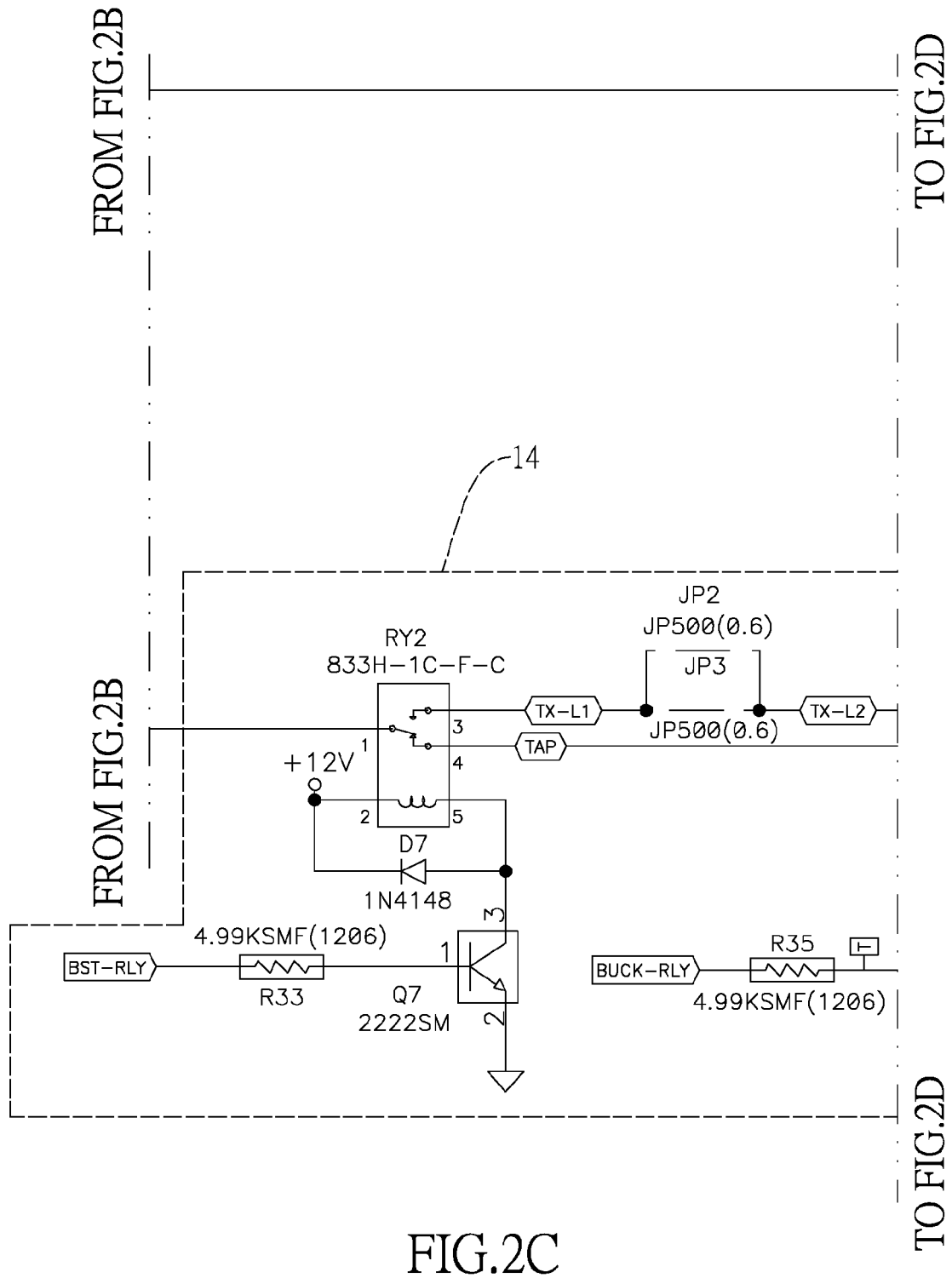
Figure 2D:
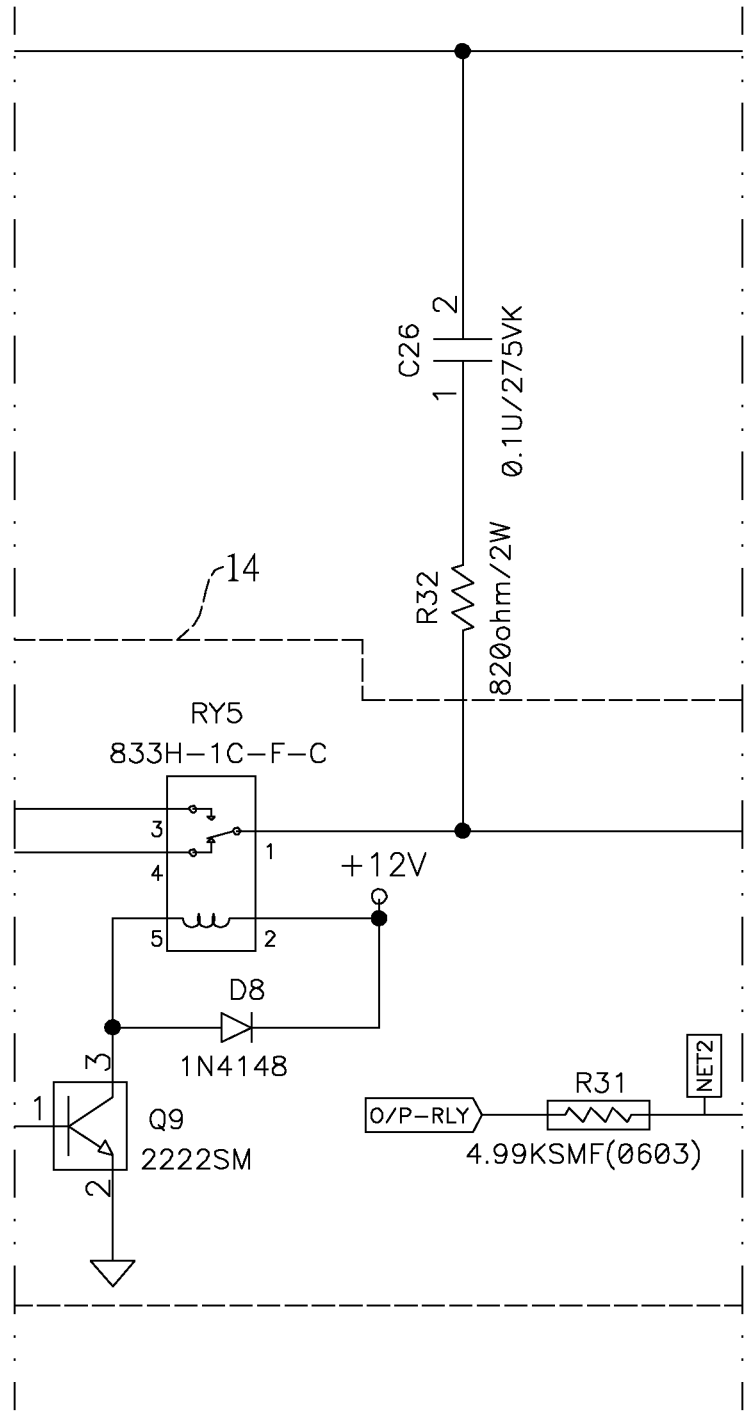
Figure 2E:
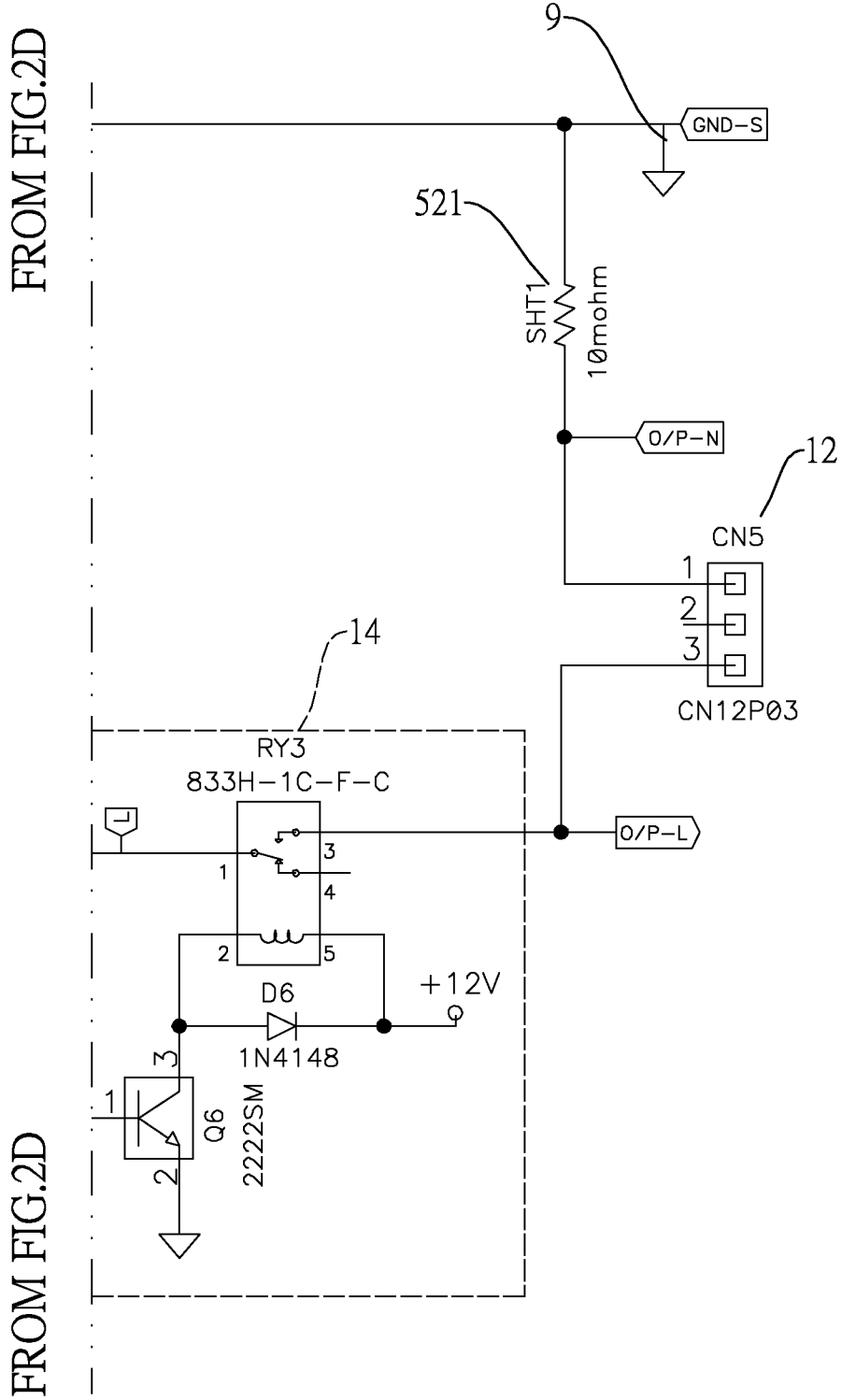
Figure 3A:
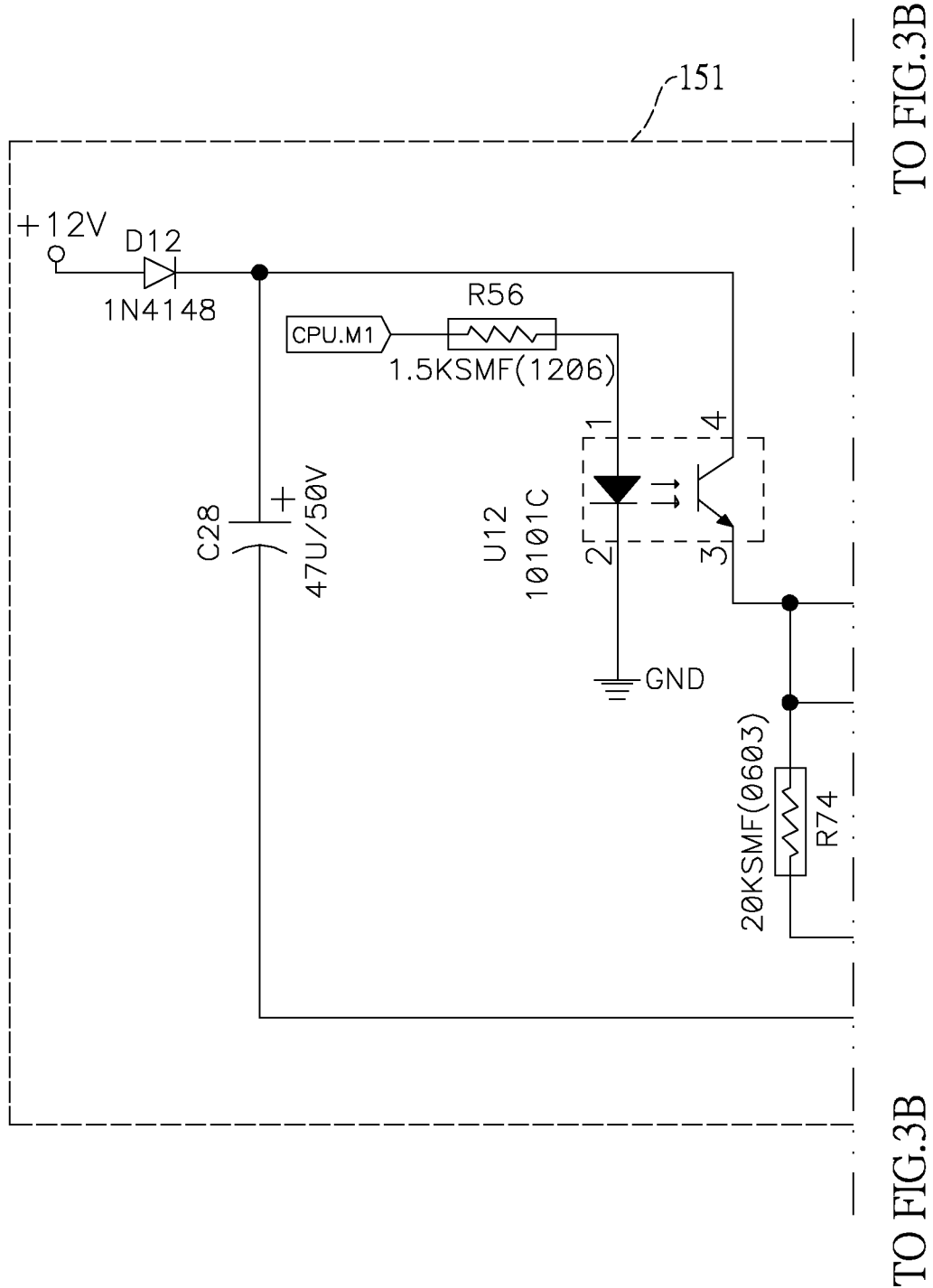
Figure 3C:
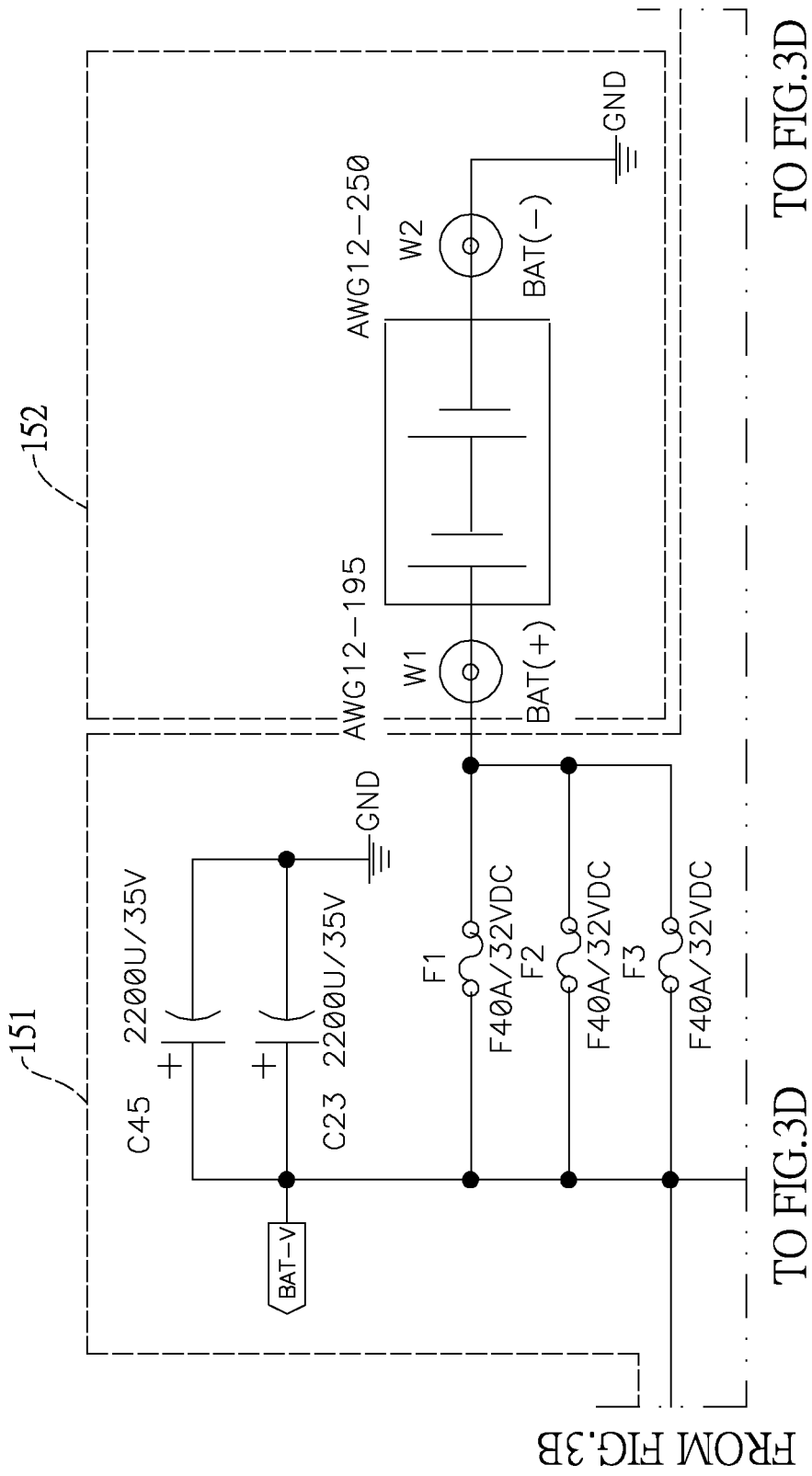
Figure 3D:
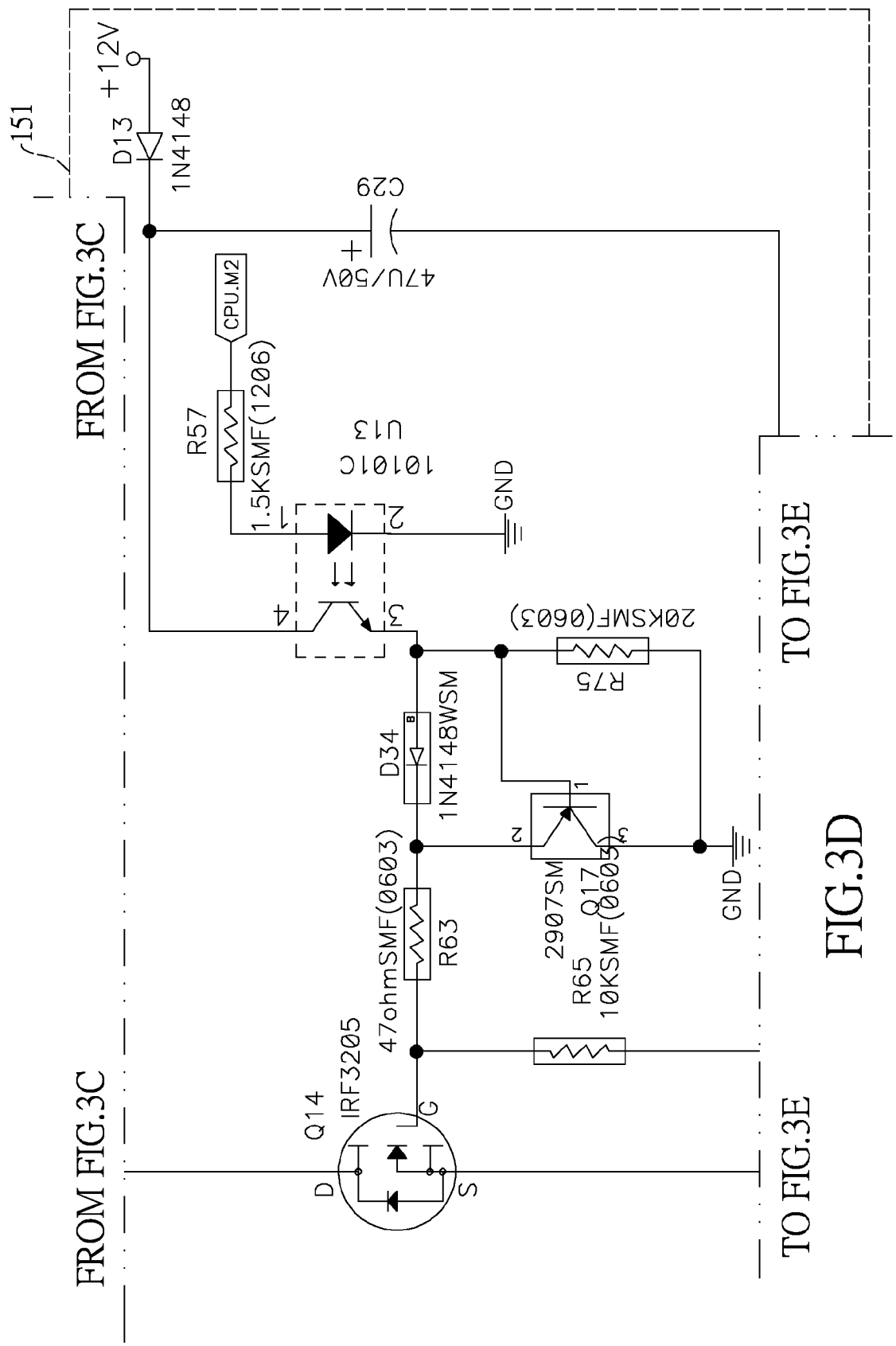
Figure 3E:
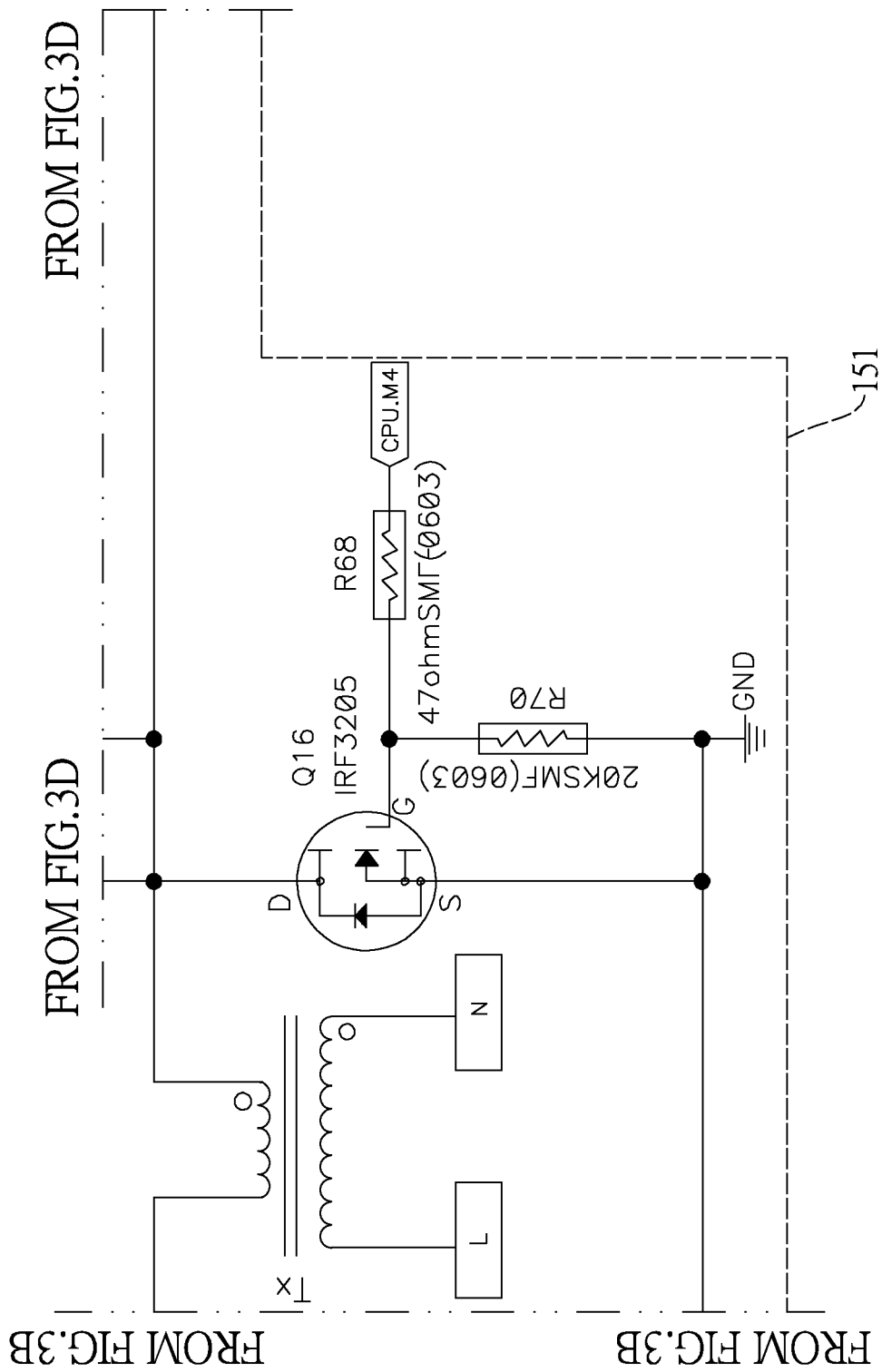

With reference to FIG. 1, a UPS system having a simplified voltage detection circuit in accordance with the present invention is connected to a live line and a neutral line of the AC mains and has a system ground terminal 9. The UPS system further has a main circuit 10, a frequency detection module 20, a voltage division module 30, a central controller 40 and an output power detection unit 50.

The main circuit 10 is grounded through the system ground terminal 9 and has a power input terminal set 11, a power output port 12, two switches 13, a mains power processing unit 14 and a backup power circuit 15. The power input terminal set 11 has a live terminal 111 and a neutral terminal 112 respectively connected to the live line and the neutral line of the AC mains. The live terminal 111 is connected to the power output port 12 and the backup power circuit 15 through one of the switches 13 and the mains power processing unit 14. The neutral terminal 112 is connected to the power output port 12, the system ground terminal 9 and the backup power circuit 15 through the other switch 13. The backup power circuit 15 has an AC and DC converter 151 and a rechargeable battery 152. The AC and DC converter 151 is connected to the live terminal 111 and the neutral terminal 112 through the respective switches 13. The rechargeable battery 152 is connected to the AC and DC converter 151. With reference to FIGS. 2A to 2E, a main circuit 10 without the backup power circuit 15 is shown. With reference to FIGS. 3A to 3E, the backup power circuit 15 is shown.

The frequency detection module 20 is grounded through the system ground terminal 9 and has two input terminals and a detected frequency output terminal 21. The input terminals are respectively connected to the live terminal 111 and the neutral terminal 112 of the power input terminal set 11 of the main circuit 10 for the frequency detection module 20 to detect a frequency of the mains power. The detected frequency output terminal 21 is separated from the input terminals of the frequency detection module 20.

Figure 4:
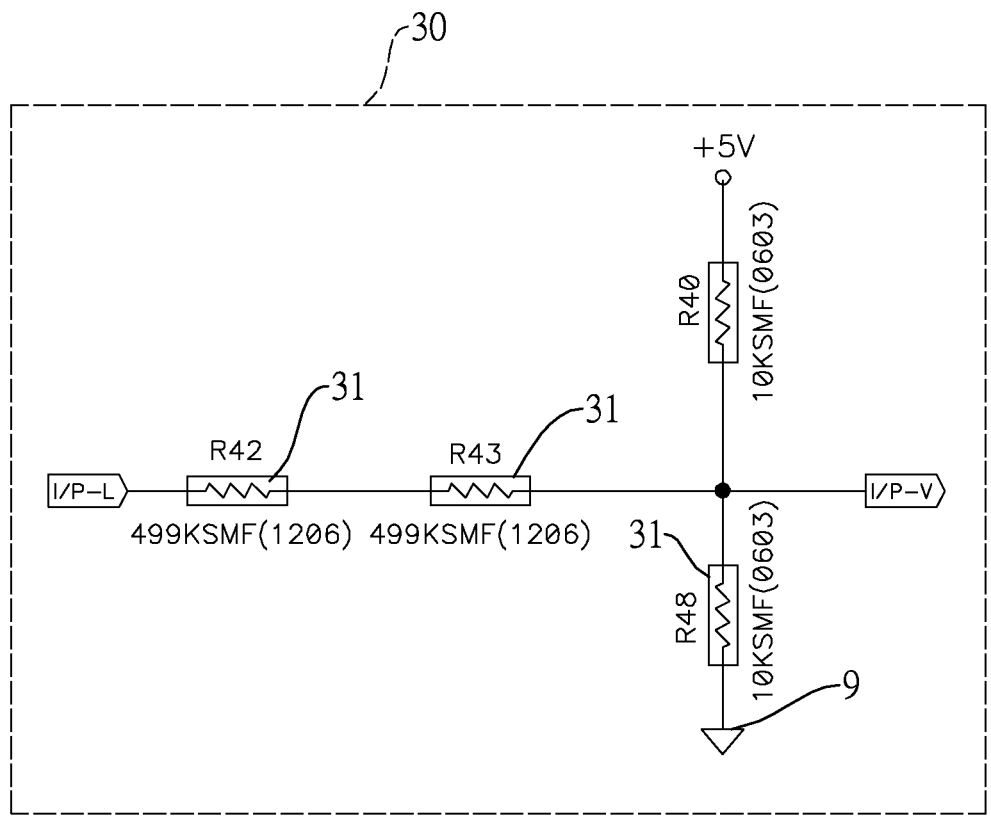
FIG. 4 is a circuit diagram of a voltage division module in FIG. 1.
Figure 5A:
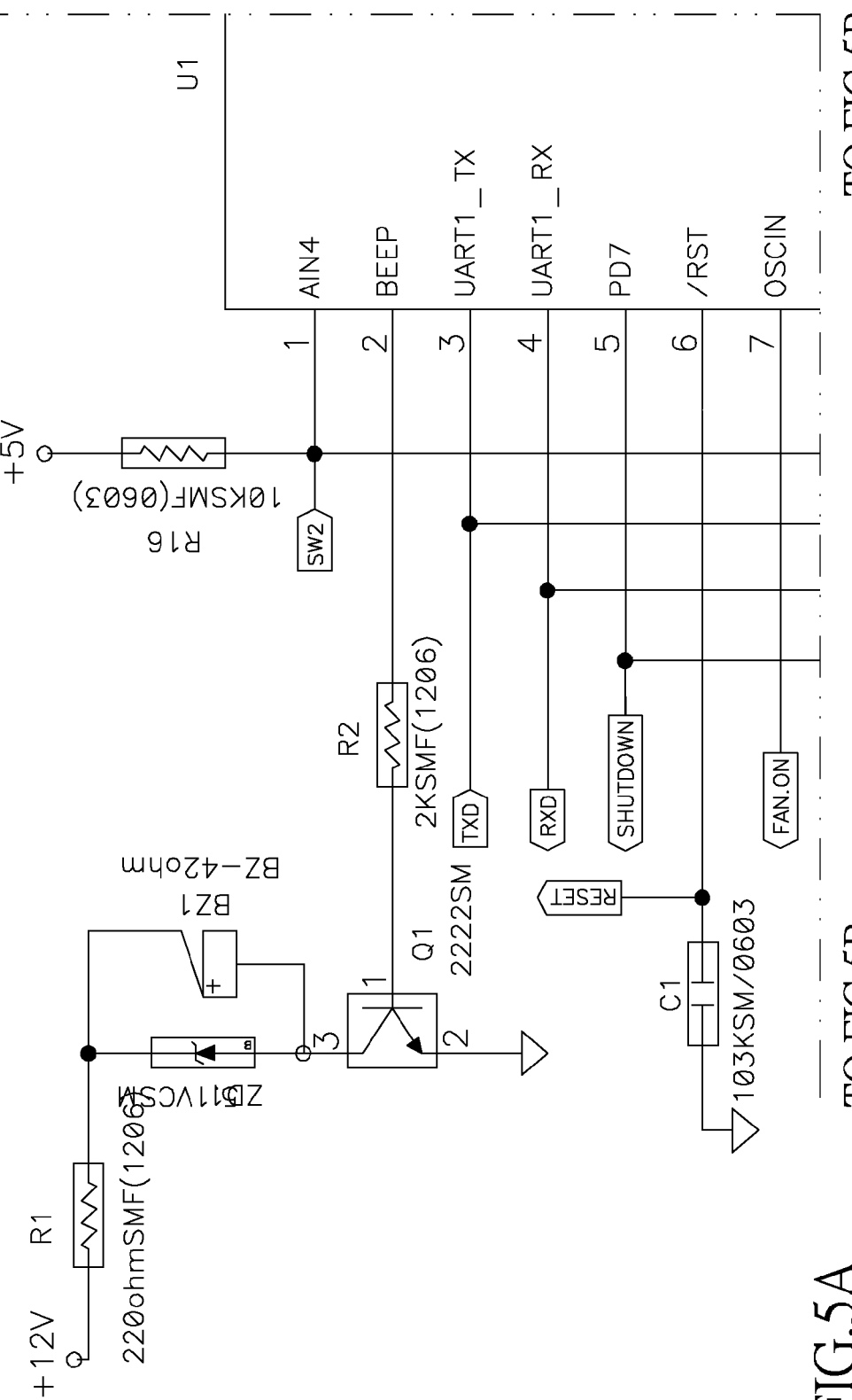
Figure 5B:
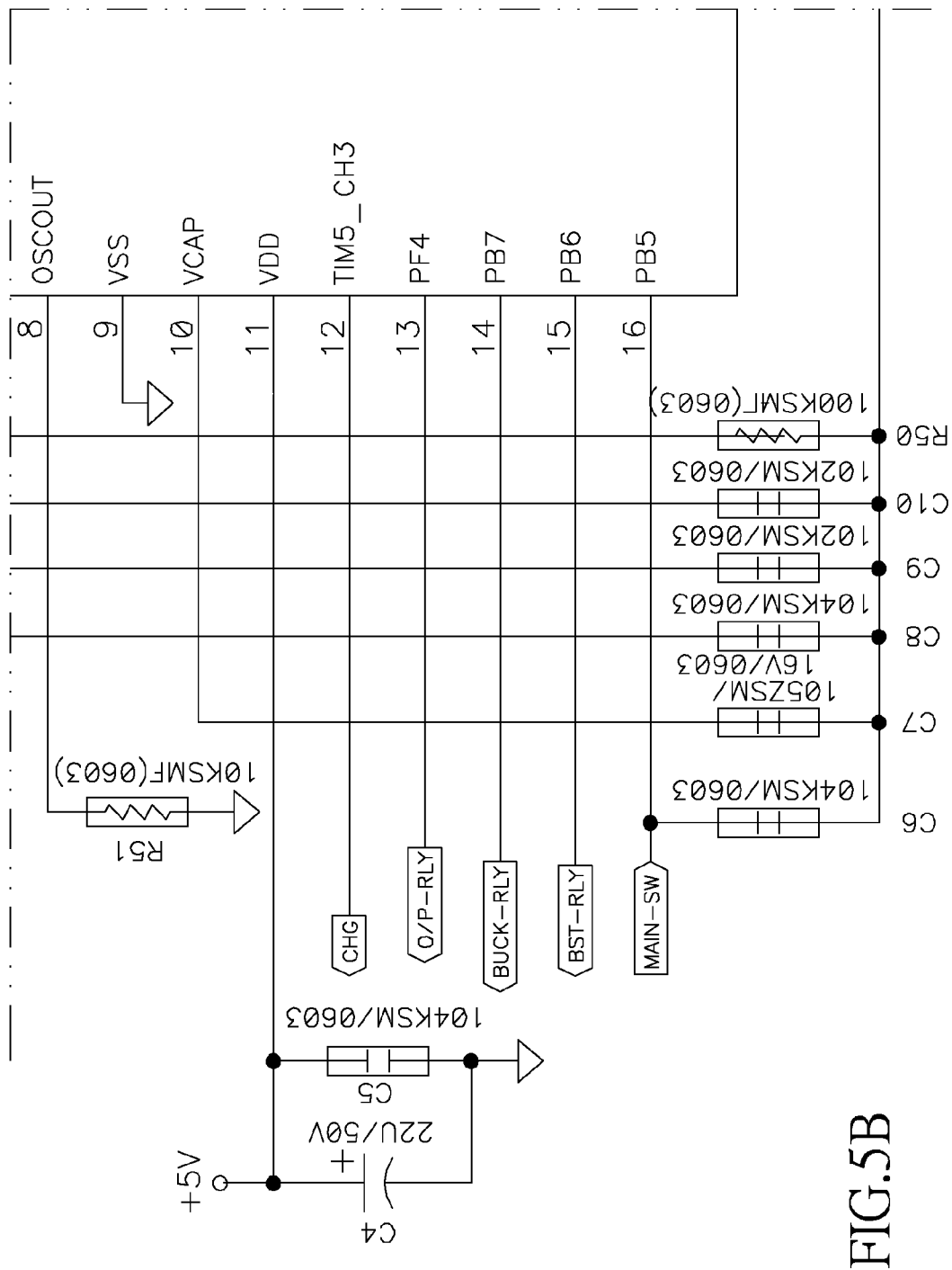
Figure 5C:
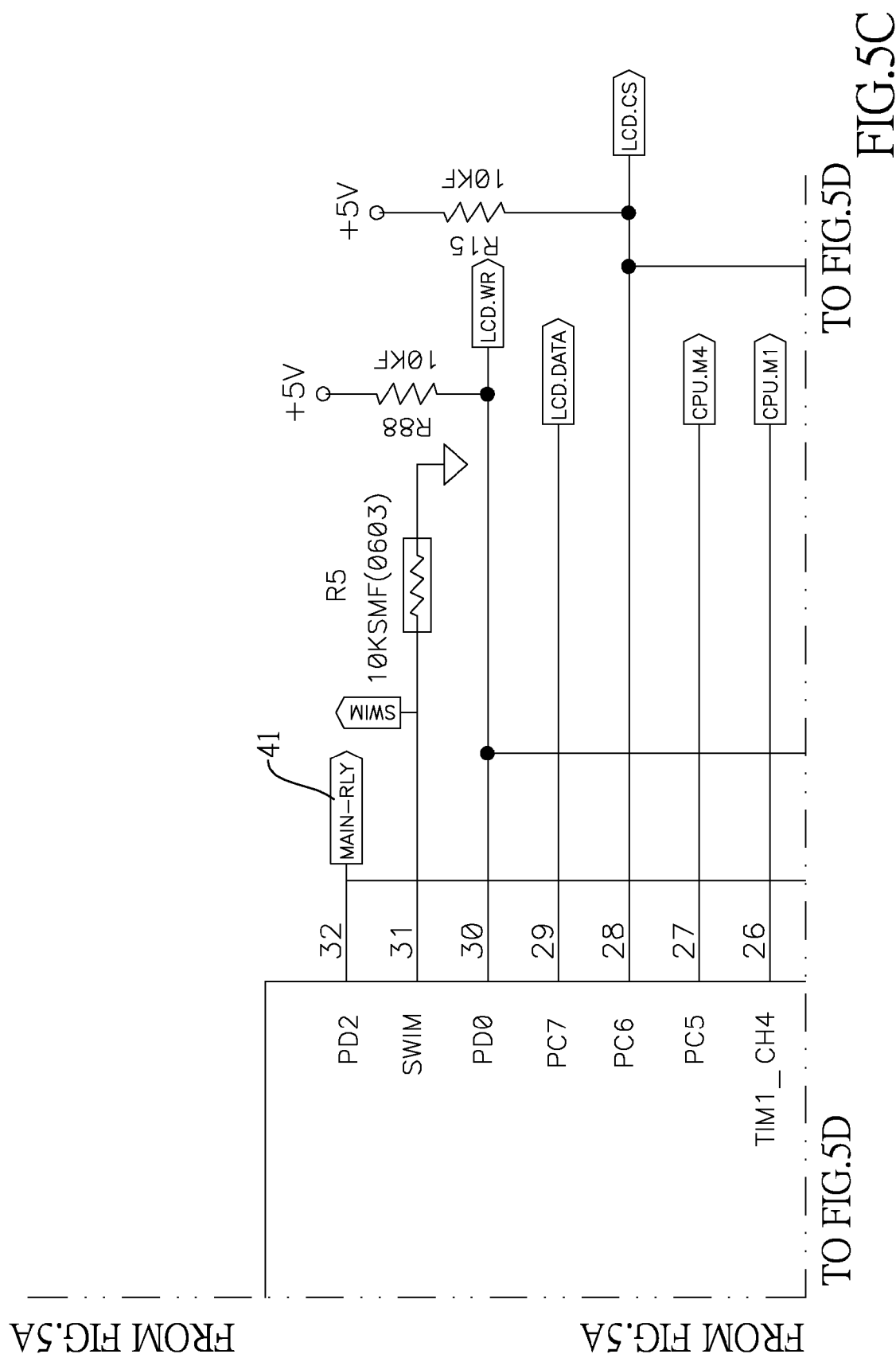

The voltage division module 30 is connected to the live terminal 111 of the power input terminal set 11 of the main circuit 10 and the system ground terminal 9. With reference to FIG. 4, the voltage division module 30 has multiple voltage dividers 31 connected between the live terminal 111 and the system ground terminal 9 to divide an input voltage of the live line of the AC mains to form an output voltage of the voltage division module 30 equal to a fraction of the input voltage of the live line.

With reference to FIGS. 5A to 5D, a central controller 40 has two control terminals 41 and a ground terminal 42, is built in with a frequency value range and a voltage value range, and is connected to the frequency detection module 20 and the voltage division module 30. The ground terminal 42 is grounded through the system ground terminal 9. When detecting that a frequency value of the mains power falls within the frequency value range through the frequency detection module 20, the central controller 40 switches on the switch 13 connected to the neutral terminal 112. When detecting that the value of the divided voltage outputted from the voltage division module 30 falls within the voltage value range, the central controller 40 switches on the switch 13 connected to the live terminal 111.

Figure 6:
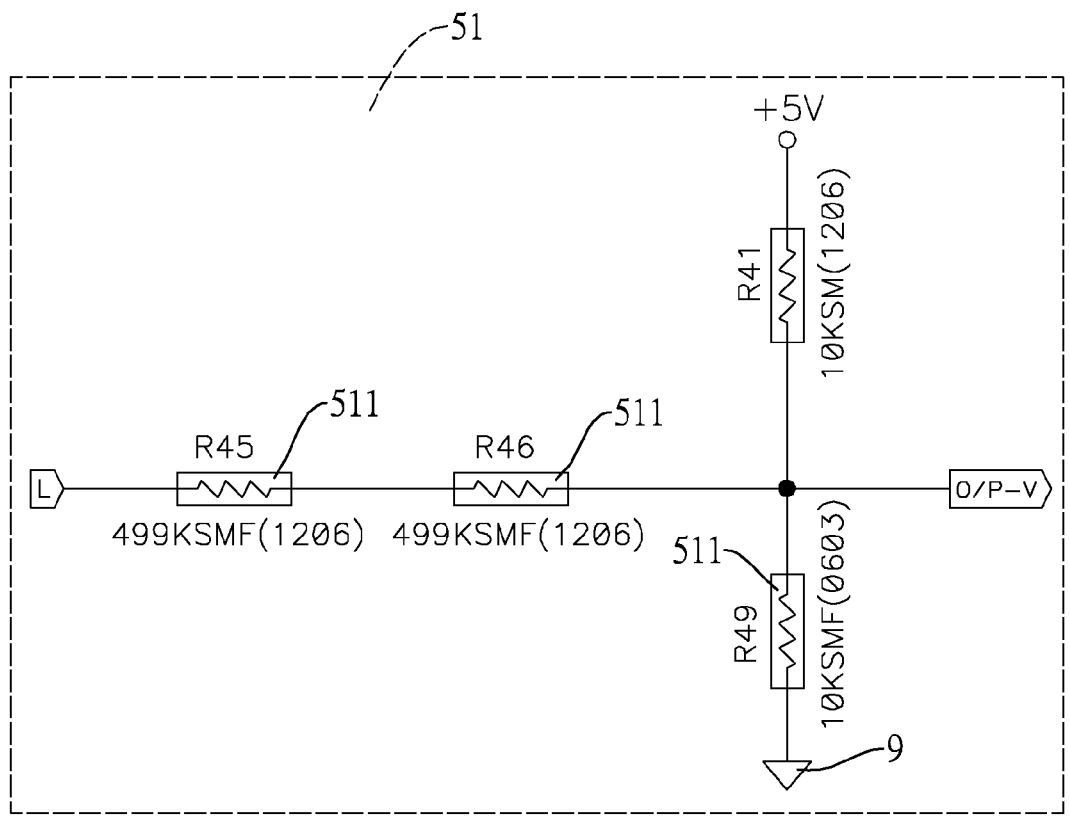
FIG. 6 is a circuit diagram of an output voltage division circuit of an output power detection unit in FIG. 1.
Figure 7:
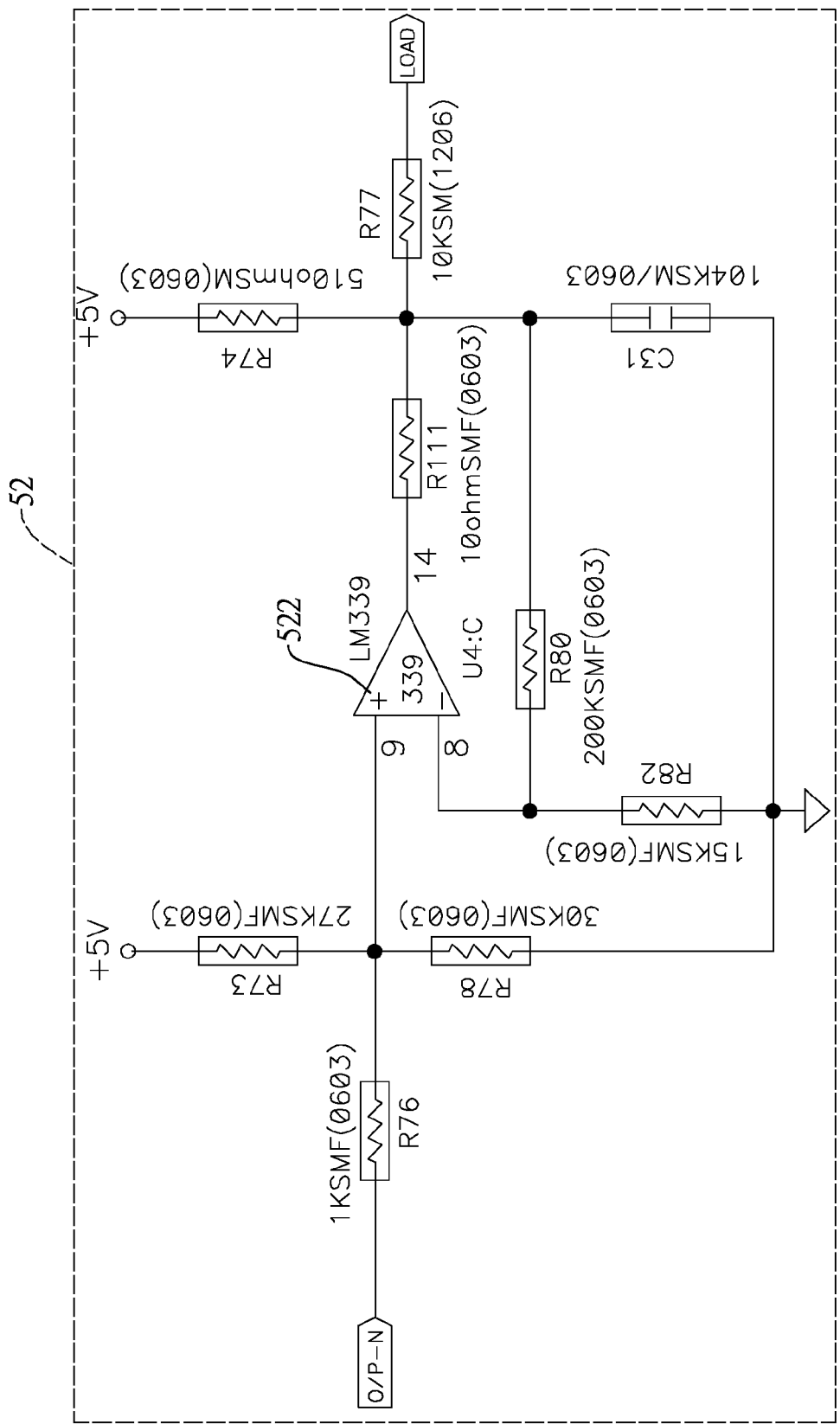
FIG. 7 is a circuit diagram of a current detection circuit of the output power detection unit in FIG. 1.

The output power detection unit 50 is connected to the power output port 12 and the central controller 40, and has an output voltage division circuit 51 and a current detection circuit 52. With reference to FIG. 6, the output voltage division circuit 51 has multiple voltage dividers 511 connected between a junction point of the power output port 12 and the live terminal 111 and the system ground terminal 9 to divide an output voltage of the live terminal 111 to form an output voltage of the output voltage division circuit 51 equal to a fraction of the output voltage of the live terminal 111. With reference to FIGS. 2, 3 and 7, the current detection circuit 52 has a current detection resistor 521 and an operational amplifier 522. The current detection resistor 521 is serially connected between the system ground terminal 9 and the power output port 12. The operational amplifier 522 is parallelly connected with both ends of the current detection resistor 521. The current detection circuit 52 superposes a positive voltage to the voltage across the current detection resistor 521 so that the overall voltage across the current detection resistor 521 is greater than 0 V and is amplified and outputted to the central controller 40 by the operational amplifier 522 for detecting the current flowing through the current detection resistor 521.

The central controller 40 first detects the frequency of the mains power from the power input terminal set 11 using the frequency detection module 20 and determines if the frequency falls within the built-in frequency value range. If positive, the central controller 40 controls the switch 13 connected to the neutral line 112 of the power input terminal set 11 to switch on. Thus, the neutral line of the AC mains and the system ground terminal 9 are equipotential so that the neutral line of the AC mains and the ground terminal 42 of the central controller 40 are also equipotential. The central controller 40 can directly detect the voltage of the live line of the AC mains and requires no additional circuit for providing isolating effect. Hence, after the voltage division module 30 divides the voltage of the live line of the AC mains, the central controller 40 then detects the divided voltage. The voltage division module 30 can be implemented by multiple voltage dividers 31. Likewise, the output voltage from the power output port 12 is divided and detected by multiple voltage dividers 511. Accordingly, the circuit is simplified and the production cost is reduced. The current detection circuit 52 can also be achieved by an operational amplifier 522 to simplify the complexity of circuit. The operational amplifier 522 costs less and occupies less space than a current transformer does, thereby further diminishing the space occupied by the circuit.

Figure 8:
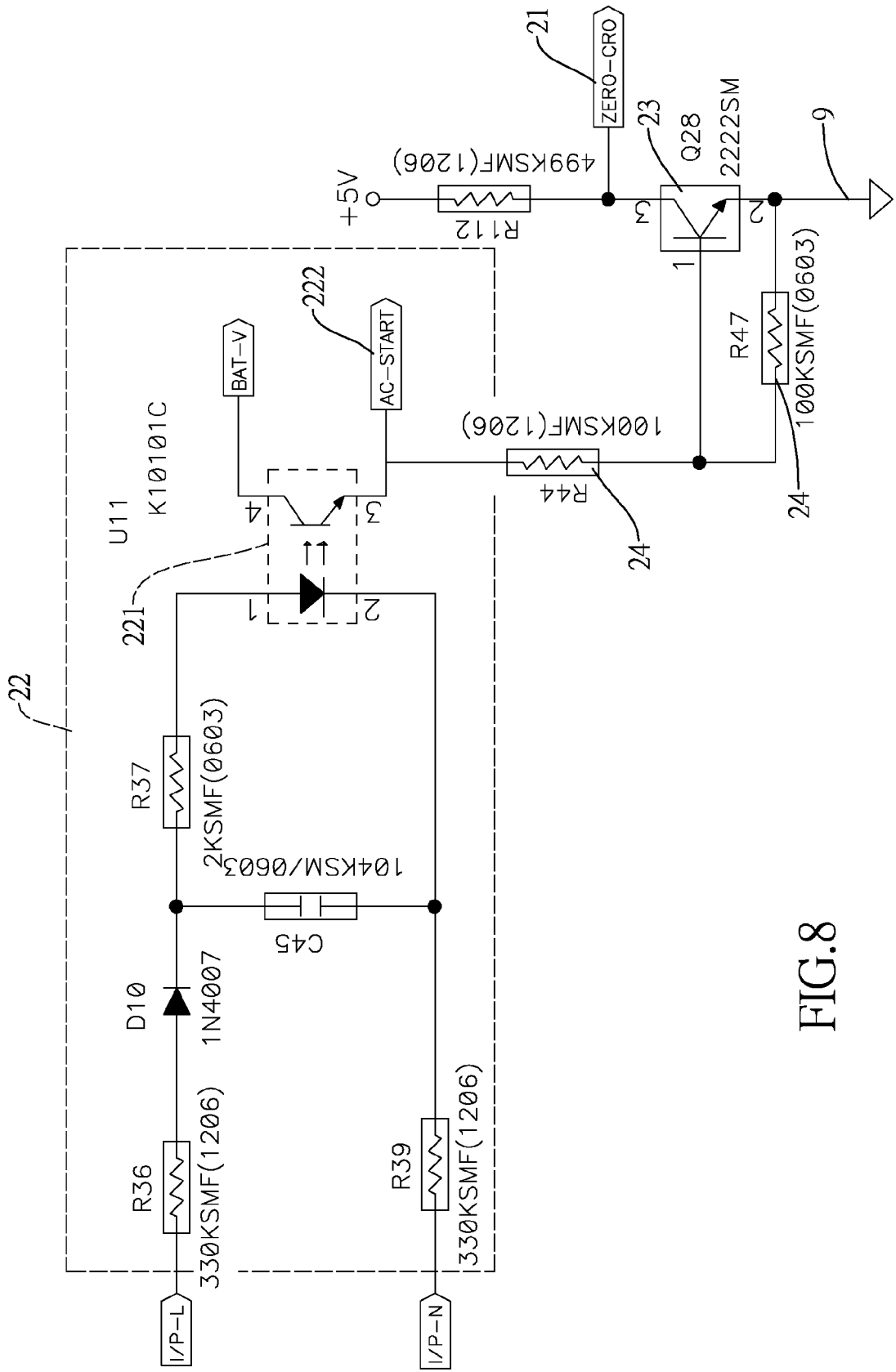
FIG. 8 is a circuit diagram of a frequency detection module in FIG. 1.
Figure 9:
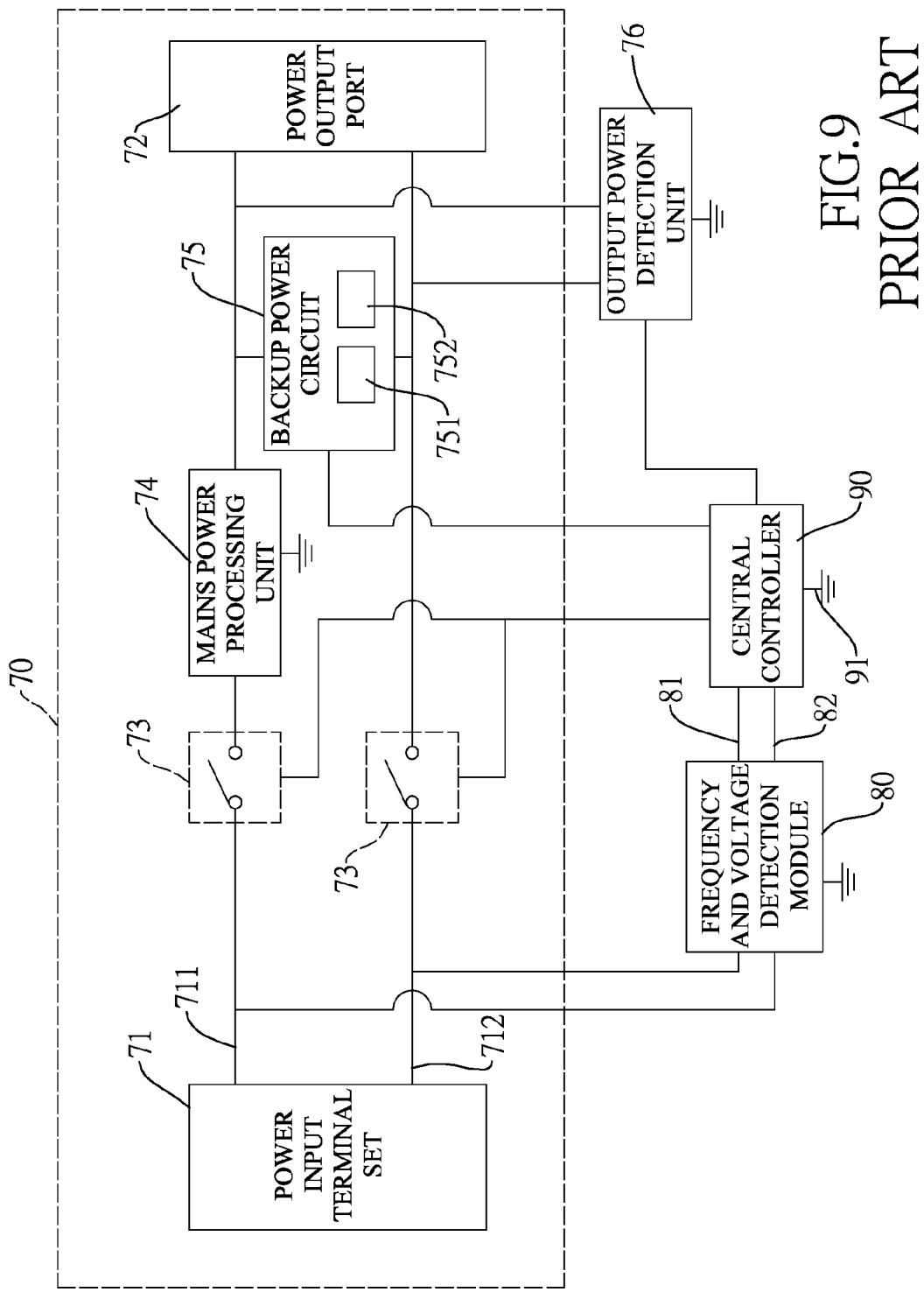
FIG. 9 is a functional block diagram of a conventional UPS system.
Figure 10A:
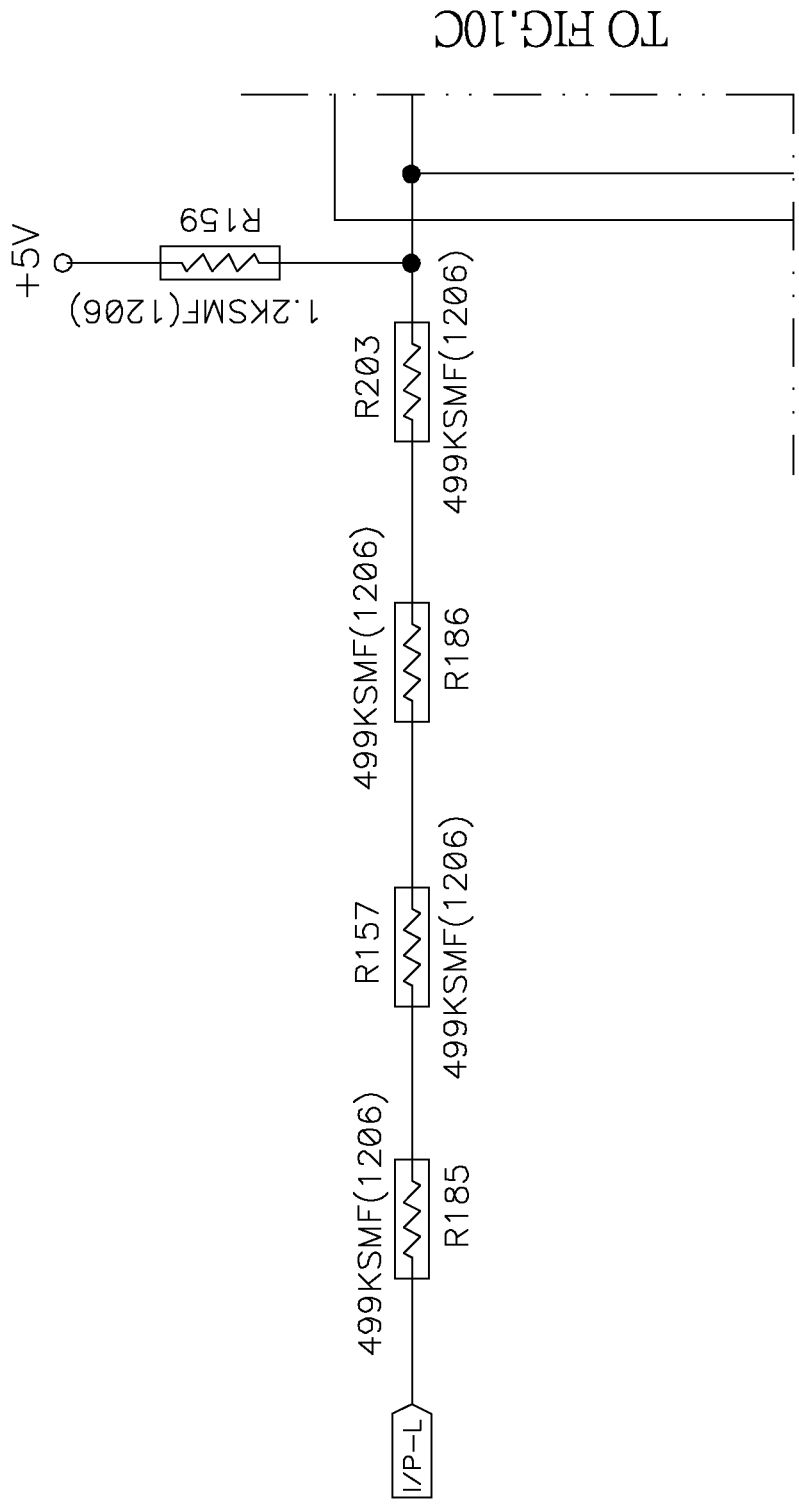
FIGS. 10A to 10D are divisions of a circuit diagram of a frequency and voltage detection module in FIG. 9.
Figure 10B:
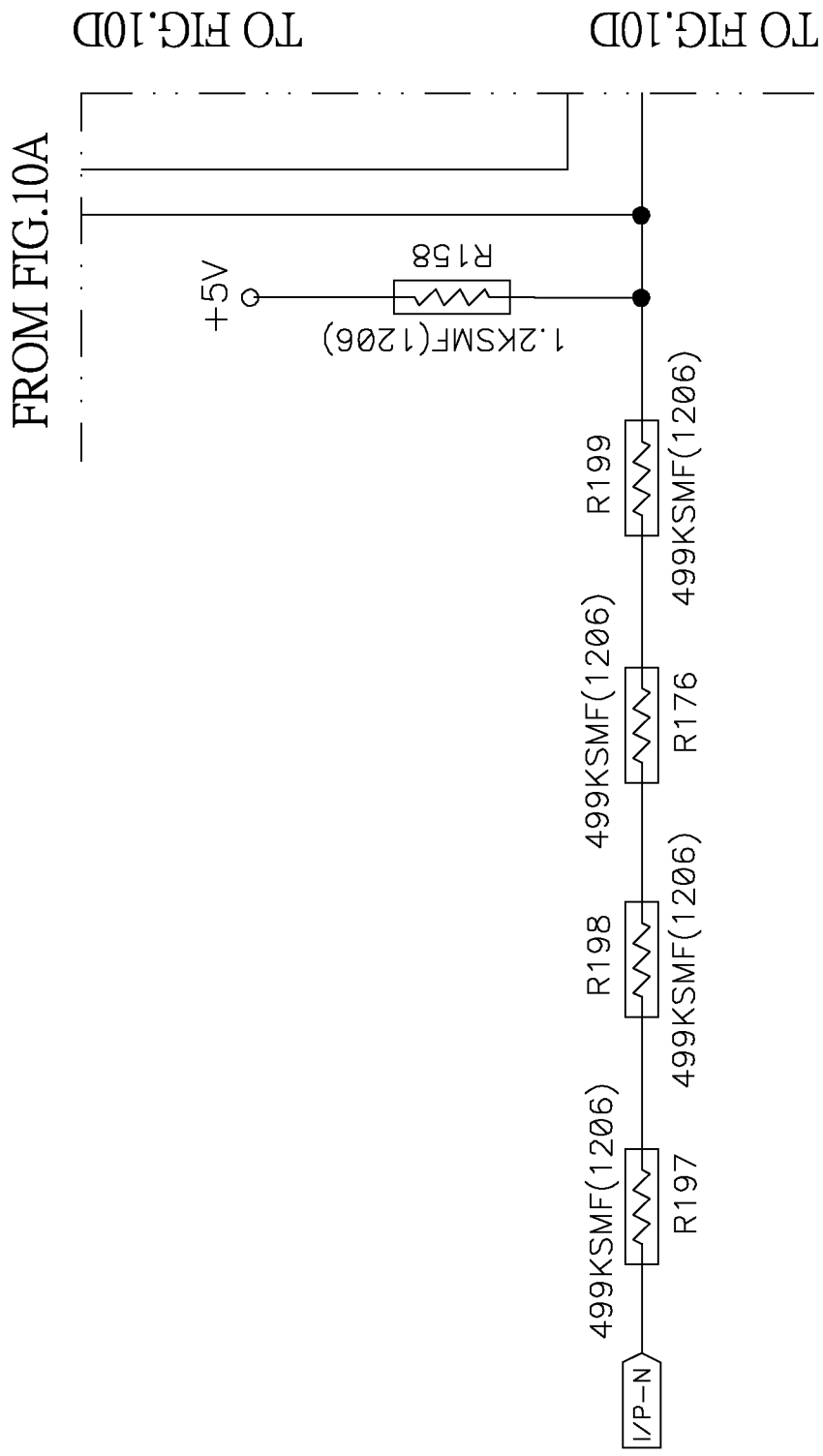
Figure 10C:
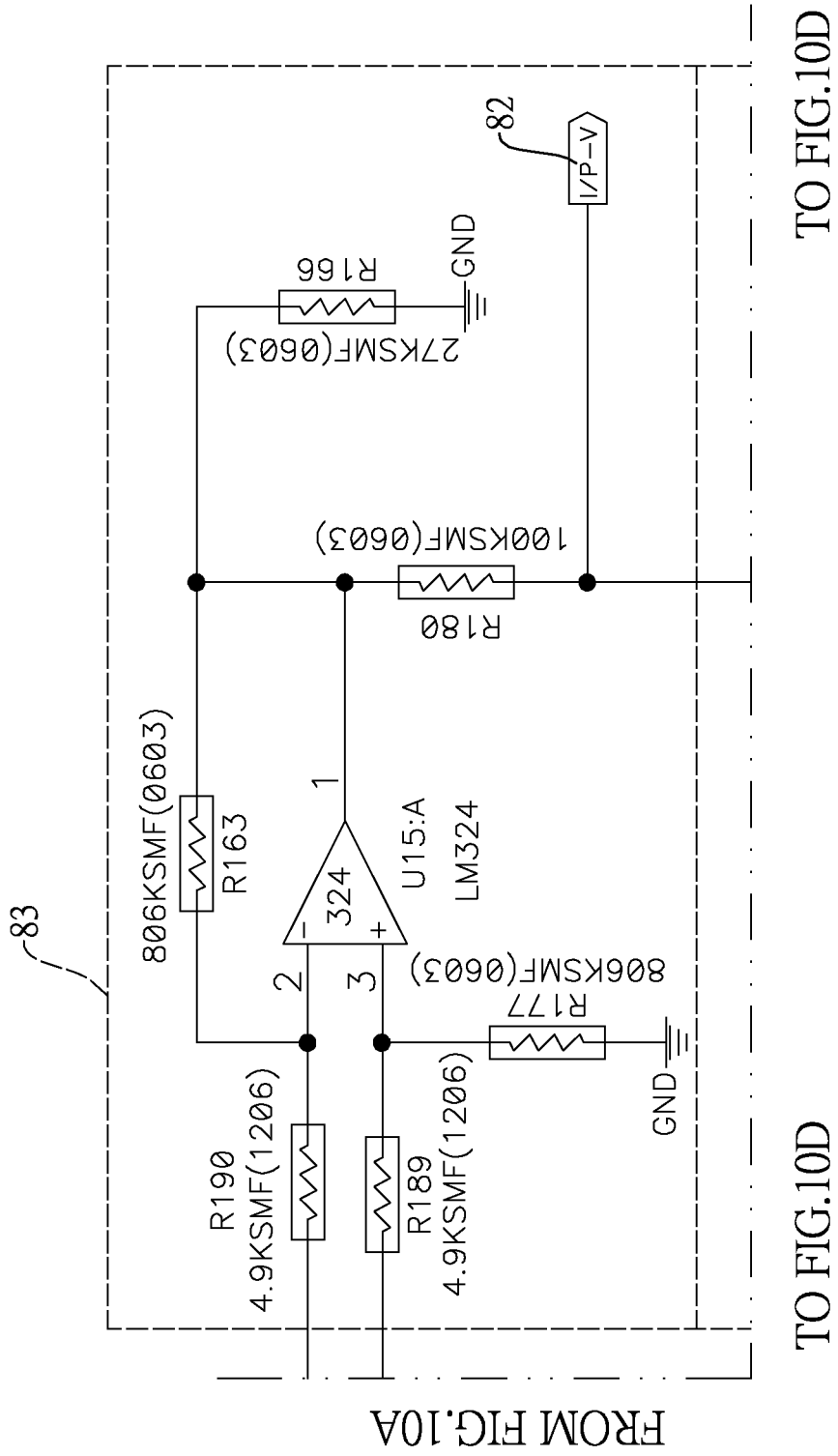
Figure 10D:
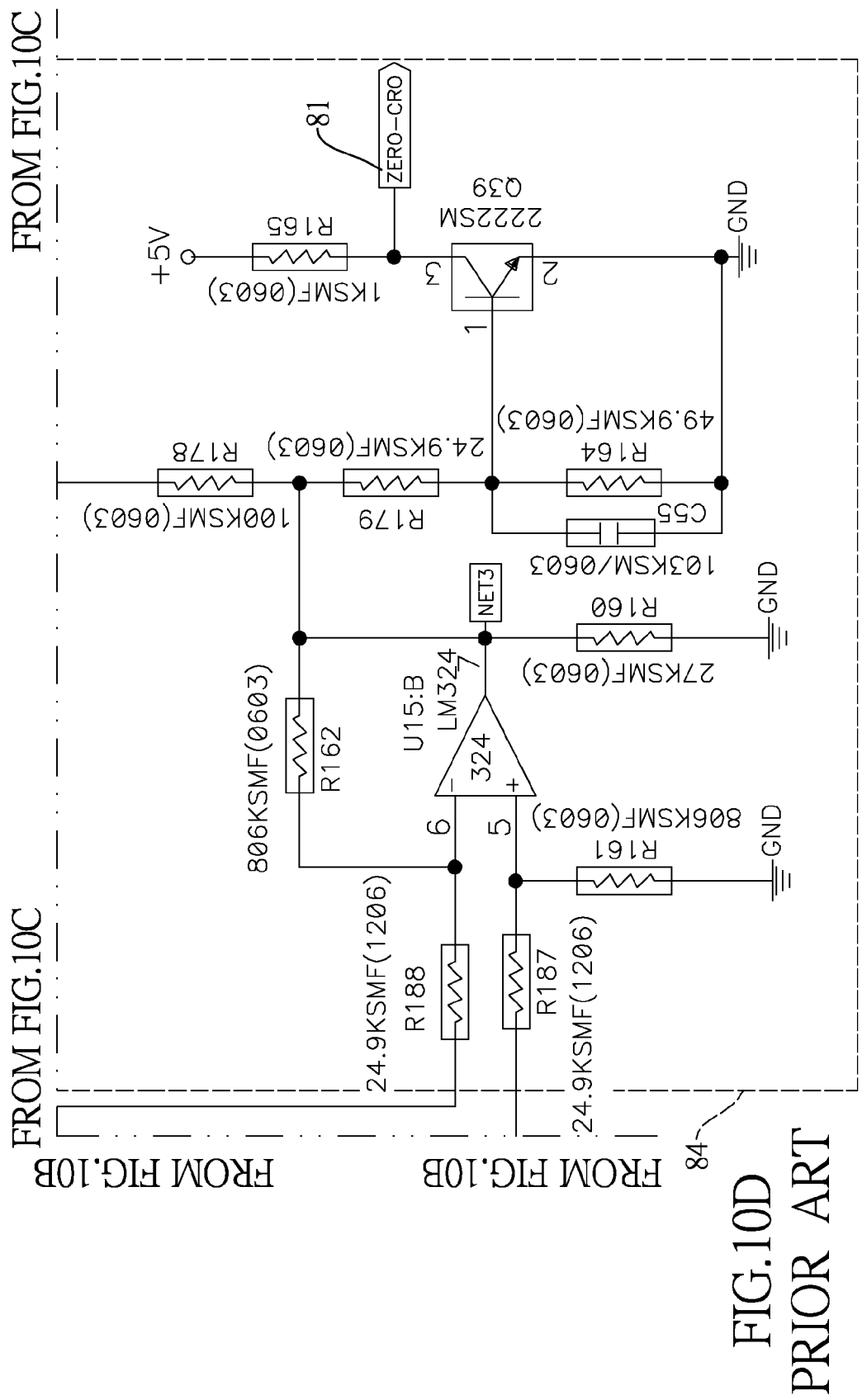
Figure 11A:
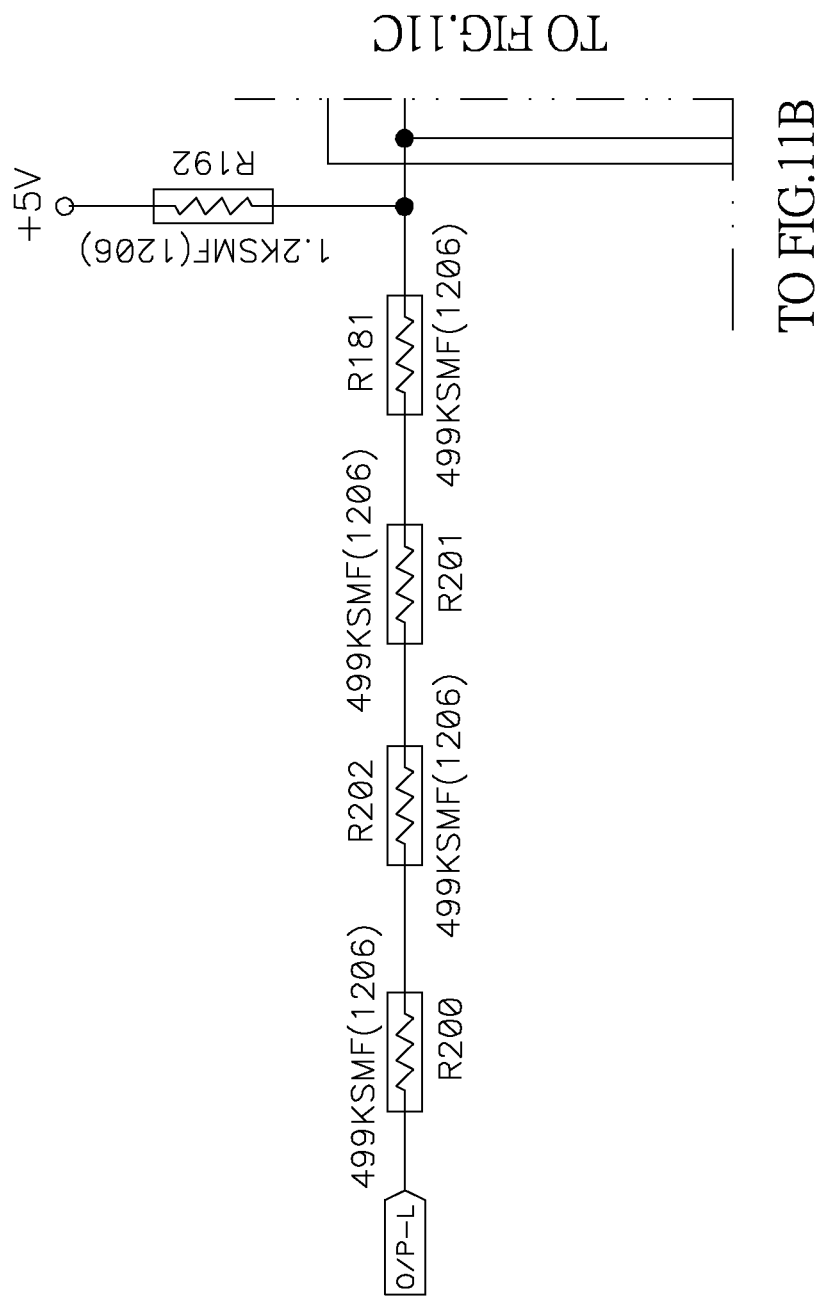
FIGS. 11A to 11D are divisions of a circuit diagram of a voltage detection circuit of an output power detection unit in FIG. 9.
Figure 11B:
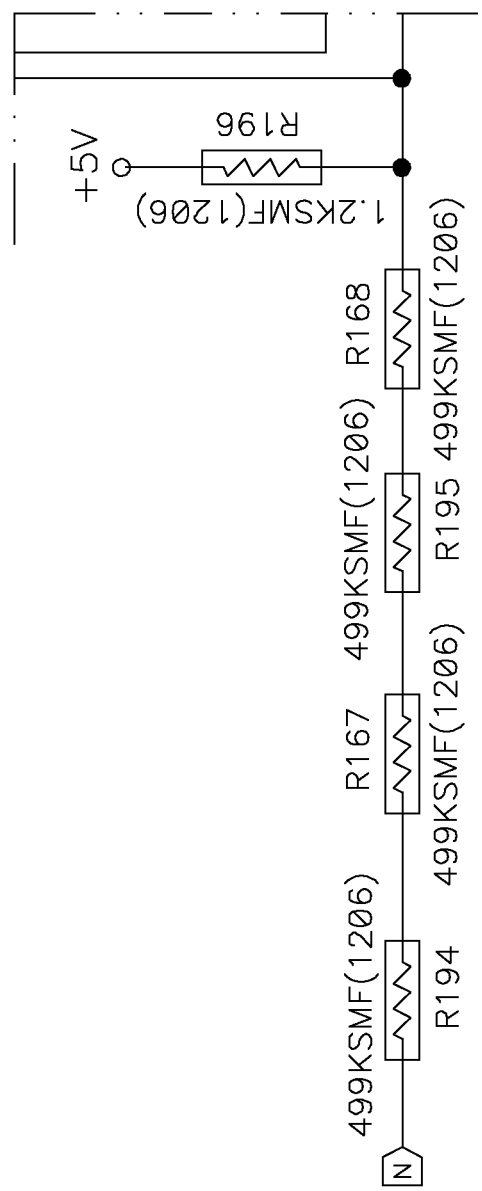
Figure 11C:
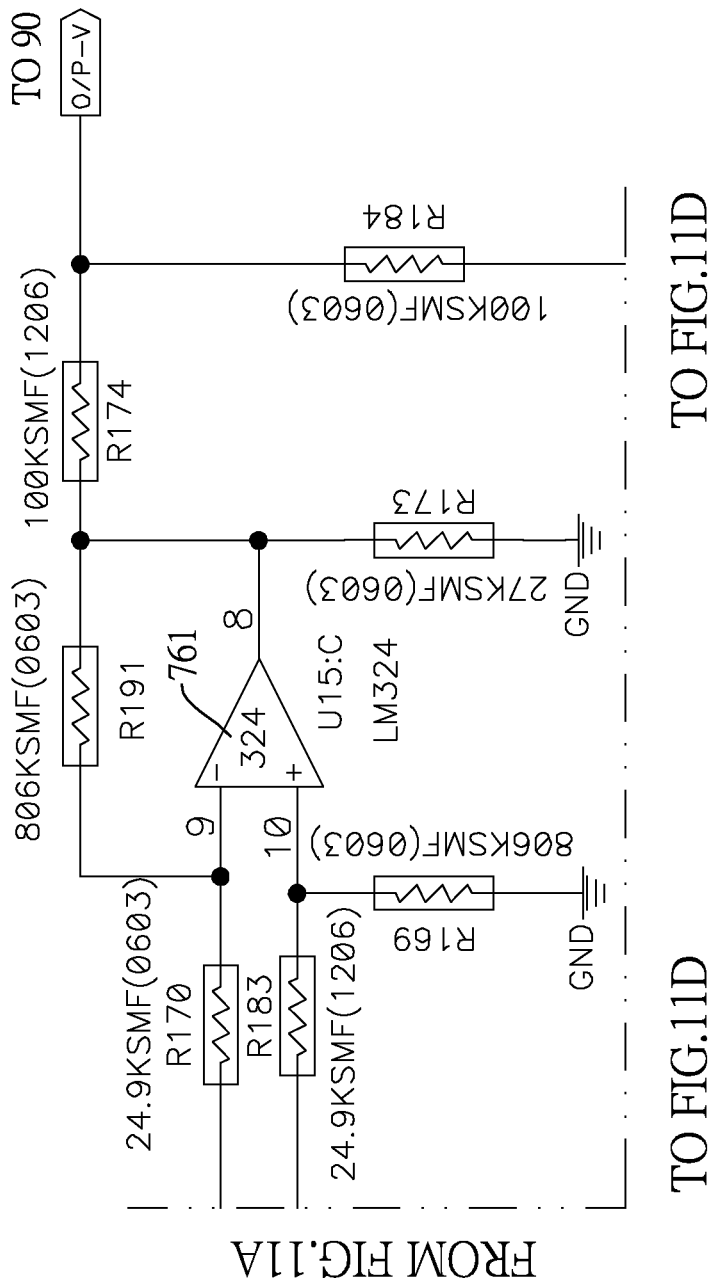
Figure 11D:
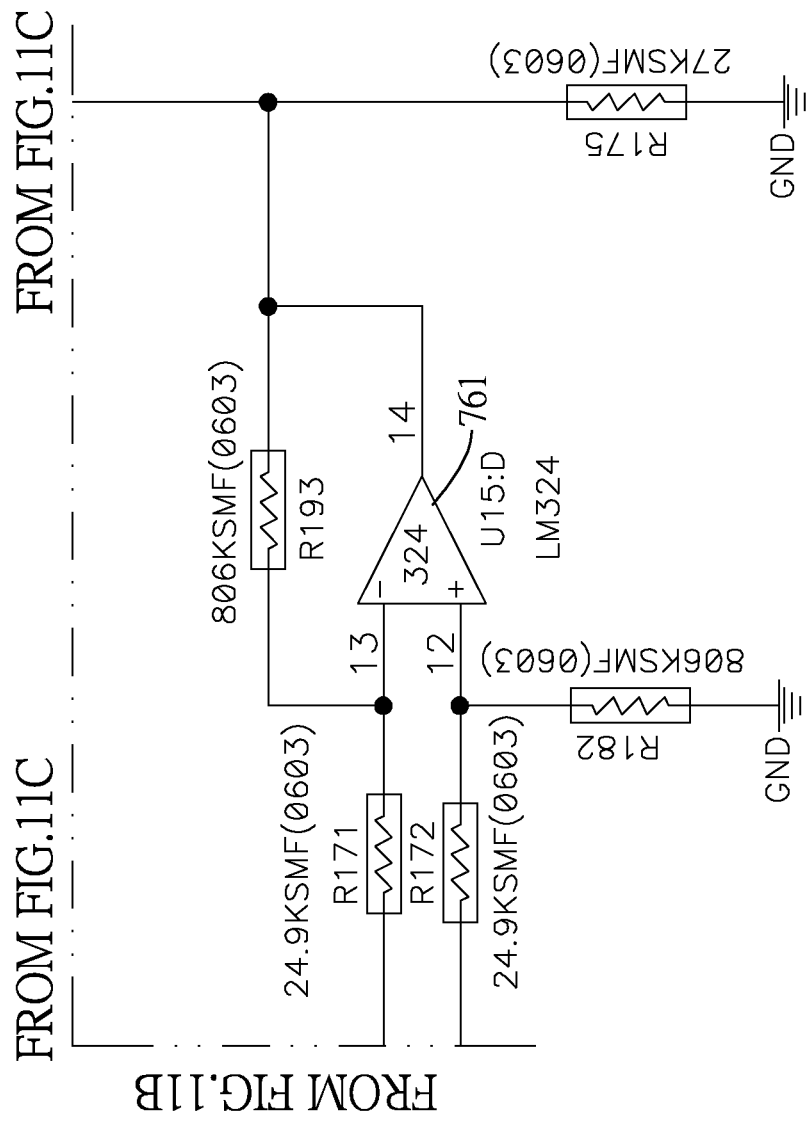
Figure 12:
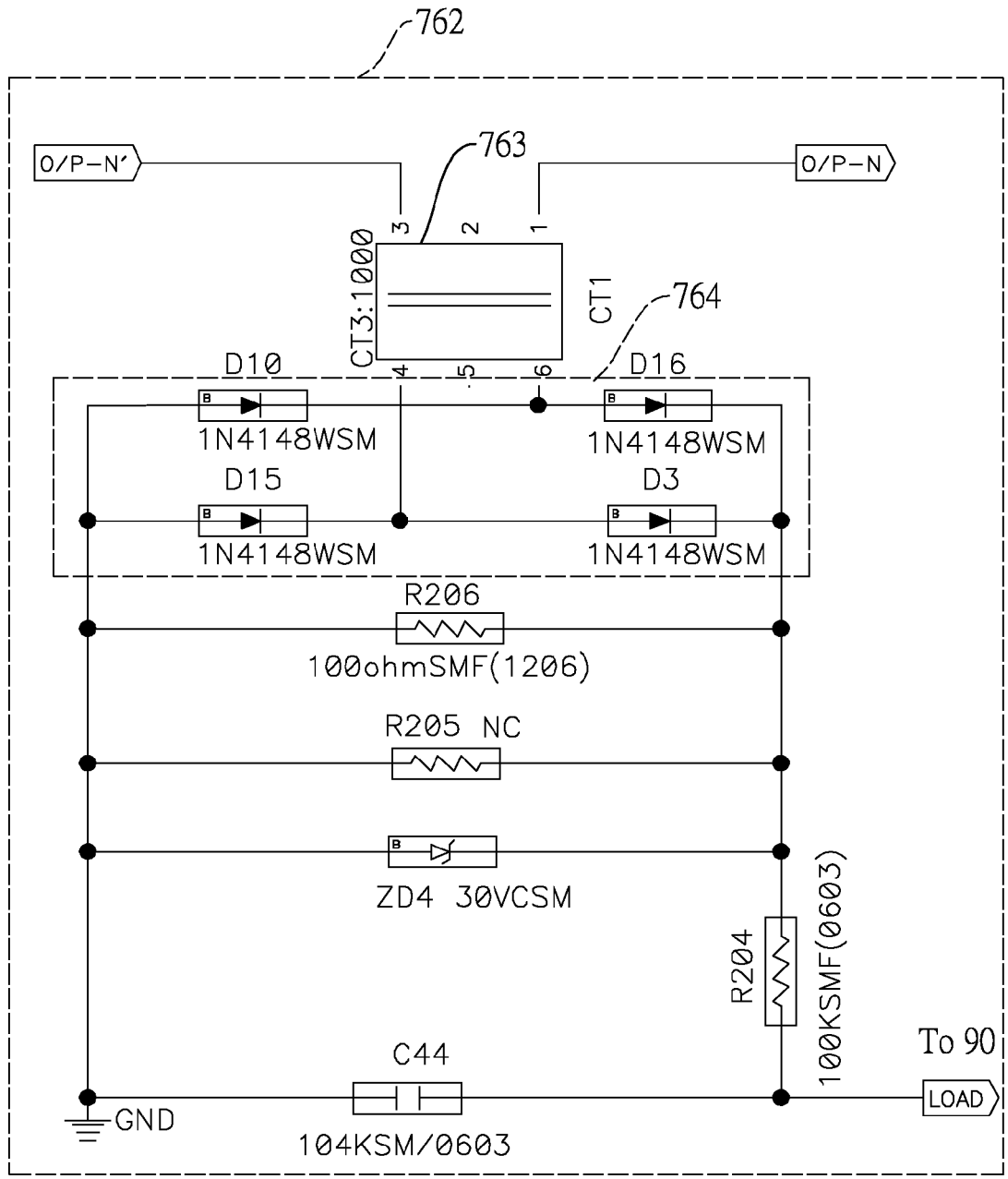
FIG. 12 is a circuit diagram of a current detection circuit of the output power detection unit in FIG. 9.

Additionally, as just required for detecting the frequency of the AC mains, the frequency detection module 20 can be implemented by the circuit in FIG. 8. The frequency detection module 20 has multiple resistors 24, an AC detection unit 22 and a transistor 23. The AC detection unit 22 has a photo coupler 221. The photo coupler 221 is connected to the live line and the neutral line of the AC mains to sense the frequency of the mains power, and has a sensing output terminal 222 connected to the system ground terminal 9 through the resistors 24. The transistor 23 is parallelly connected with one of the resistors 24 and is connected to the detected frequency output terminal 21. After the voltage of the sensing output terminal 222 of the photo coupler 221 is divided by the resistors 24, a partial voltage of the sensing output terminal 222 switches the transistor 23 on and a positive voltage (+5V) is superposed to the detected frequency output terminal 21 and the superposed signal is outputted to the central controller 40 for detecting the frequency of the mains power. The aforementioned AC detection unit has been adopted in part of the conventional UPS system. When those UPS systems are powered off but connected to the AC mains, the AC detection unit 22 can detect that the UPS systems are connected to the AC mains and establishes a system power source using the mains power. However, the frequency detection module 20 only requires a transistor 23 and multiple resistors 24 in the AC detection unit 22 to address circuit simplification, reduced space occupation and lower production cost.

In sum, when the UPS system of the present invention detects that the frequency of mains power is normal, the ground terminal of the central controller and the neutral line of the AC mains are set to be equipotential. Accordingly, an errorless and direct detection of the potential of the live line of the AC mains can be achieved by using multiple voltage dividers in the power input terminal set and power output port, thereby significantly mitigating the circuit sophistication of the UPS system. Besides, as the frequency detection module only needs to detect the frequency of the mains power, all it needs is to add a transistor and multiple resistors in the conventional UPS systems, further simplifying the circuit.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An uninterruptible power supply (UPS) system connected to a live line and a neutral line of an AC mains supplying mains power, and having a system ground terminal, the UPS system comprising:

a main circuit grounded through the system ground terminal and having:
a power output port;
two switches;
a mains power processing unit;
a backup power circuit; and
a power input terminal set having a live terminal and a neutral terminal respectively connected to the live line and the neutral line of the AC mains, wherein the live terminal is connected to the power output port and the backup power circuit through one of the switches and the mains power processing unit, and the neutral terminal is connected to the power output port, the system ground terminal and the backup power circuit through the other switch;

a frequency detection module grounded through the system ground terminal and having:

two input terminals respectively connected to the live terminal and the neutral terminal of the power input terminal set of the main circuit for the frequency detection module to detect a frequency of the mains power; and
a detected frequency output terminal separated from the input terminals of the frequency detection module;
a voltage division module connected to the live terminal of the power input terminal set of the main circuit and the system ground terminal, and having:
multiple voltage dividers connected between the live terminal and the system ground terminal to divide an input voltage of the live line of the AC mains into an output voltage of the voltage division module equal to a fraction of the input voltage of the live line; and
a central controller connected to the frequency detection module and the voltage division module, and having:
two control terminals;
a ground terminal grounded through the system ground terminal; and
a frequency value range and a voltage value range built therein;
wherein when detecting that a value of the frequency of the mains power falls within the frequency value range through the frequency detection module, the central controller switches on the switch connected to the neutral terminal, and when detecting that the value of the divided voltage outputted from the voltage division module falls within the voltage value range, the central controller switches on the switch connected to the live terminal.

2. The UPS system as claimed in claim 1, further comprising an output power detection unit connected to the power output port and the central controller, and having:
an output voltage division circuit having multiple voltage dividers connected between a junction point of the power output port and the live terminal and the system ground terminal to divide an output voltage of the live terminal into an output voltage of the output voltage division circuit equal to a fraction of the output voltage of the live terminal; and
a current detection circuit.

3. The UPS system as claimed in claim 1, wherein the current detection circuit has:
a current detection resistor serially connected between the system ground terminal and the power output port; and
an operational amplifier parallelly connected with two ends of the current detection resistor.

4. The UPS system as claimed in claim 1, wherein the frequency detection module has:
multiple resistors;
an AC detection unit having:
a photo coupler connected to the live line and the neutral line of the AC mains to sense the frequency of the mains power, and having a sensing output terminal connected to the system ground terminal through the resistors; and
a transistor parallelly connected with one of the resistors and connected to the detected frequency output terminal;
wherein after the voltage of the sensing output terminal of the photo coupler is divided by the resistors, a partial voltage of the sensing output terminal switches the transistor on and a positive voltage is superposed to the detected frequency output terminal and the superposed signal is outputted to the central controller for detecting the frequency of the mains power.

5. The UPS system as claimed in claim 2, wherein the frequency detection module has:
multiple resistors;
an AC detection unit having:
a photo coupler connected to the live line and the neutral line of the AC mains to sense the frequency of the mains power, and having a sensing output terminal connected to the system ground terminal through the resistors; and
a transistor parallelly connected with one of the resistors and connected to the detected frequency output terminal;
wherein after the voltage of the sensing output terminal of the photo coupler is divided by the resistors, a partial voltage of the sensing output terminal switches the transistor on and a positive voltage is superposed to the detected frequency output terminal and the superposed signal is outputted to the central controller for detecting the frequency of the mains power.

6. The UPS system as claimed in claim 3, wherein the frequency detection module has:
multiple resistors;
an AC detection unit having:
a photo coupler connected to the live line and the neutral line of the AC mains to sense the frequency of the mains power, and having a sensing output terminal connected to the system ground terminal through the resistors; and
a transistor parallelly connected with one of the resistors and connected to the detected frequency output terminal;
wherein after the voltage of the sensing output terminal of the photo coupler is divided by the resistors, a partial voltage of the sensing output terminal switches the transistor on and a positive voltage is superposed to the detected frequency output terminal and the superposed signal is outputted to the central controller for detecting the frequency of the mains power.

7. The UPS system as claimed in claim 1, wherein the backup power circuit of the main circuit has:
an AC and DC converter connected to the live terminal and the neutral terminal through the respective switches; and
a rechargeable battery connected to the AC and DC converter.

8. The UPS system as claimed in claim 2, wherein the backup power circuit of the main circuit has:
an AC and DC converter connected to the live terminal and the neutral terminal through the respective switches; and
a rechargeable battery connected to the AC and DC converter.

9. The UPS system as claimed in claim 3, wherein the backup power circuit of the main circuit has:
an AC and DC converter connected to the live terminal and the neutral terminal through the respective switches; and
a rechargeable battery connected to the AC and DC converter.

10. The UPS system as claimed in claim 4, wherein the backup power circuit of the main circuit has:
an AC and DC converter connected to the live terminal and the neutral terminal through the respective switches; and
a rechargeable battery connected to the AC and DC converter.

11. The UPS system as claimed in claim 5, wherein the backup power circuit of the main circuit has:
an AC and DC converter connected to the live terminal and the neutral terminal through the respective switches; and a rechargeable battery connected to the AC and DC converter.

12. The UPS system as claimed in claim 6, wherein the backup power circuit of the main circuit has:
   an AC and DC converter connected to the live terminal and the neutral terminal through the respective switches; and
   a rechargeable battery connected to the AC and DC converter.

\* \* \* \* \*